US010061632B2

(12) United States Patent
Ben Simhon et al.

(10) Patent No.: US 10,061,632 B2
(45) Date of Patent: Aug. 28, 2018

(54) SYSTEM AND METHOD FOR TRANSFORMING OBSERVED METRICS INTO DETECTED AND SCORED ANOMALIES

(71) Applicant: Anodot Ltd., Ra'anana (IL)

(72) Inventors: Yoni Yom Tov Ben Simhon, Natanya (IL); David Drai, Natanya (IL); Ira Cohen, Reut (IL)

(73) Assignee: Anodot Ltd., Ra'anana (IL)

( * ) Notice: Subject to any disclaimer, the term of this patent is extended or adjusted under 35 U.S.C. 154(b) by 80 days.

(21) Appl. No.: 14/950,357

(22) Filed: Nov. 24, 2015

(65) Prior Publication Data

US 2016/0147583 A1 May 26, 2016

Related U.S. Application Data

(60) Provisional application No. 62/083,850, filed on Nov. 24, 2014.

(51) Int. Cl.
*G06F 11/34* (2006.01)
*G06F 11/07* (2006.01)
*H04L 12/26* (2006.01)

(52) U.S. Cl.
CPC ........ *G06F 11/076* (2013.01); *G06F 11/0721* (2013.01); *G06F 11/3447* (2013.01); *G06F 11/3452* (2013.01); *H04L 43/0823* (2013.01); *H04L 43/16* (2013.01); *G06F 11/079* (2013.01); *G06F 11/34* (2013.01); *H04L 43/08* (2013.01)

(58) Field of Classification Search
CPC .... G06F 11/0709; G06F 11/079; G06F 11/34; G06F 11/3409; G06F 11/3447; G06F 11/3452; G06F 11/3495; H04L 43/08–43/0894; H04L 63/1416; H04L 63/1425
See application file for complete search history.

(56) References Cited

U.S. PATENT DOCUMENTS

| | | | |
|---|---|---|---|
| 5,799,148 A * | 8/1998 | Cuddihy | G06N 5/04 706/58 |
| 8,943,367 B2 * | 1/2015 | Jiang | G06F 11/079 714/37 |
| 9,628,499 B1 * | 4/2017 | Yu | H04L 63/1416 |

(Continued)

*Primary Examiner* — Joseph O Schell
(74) *Attorney, Agent, or Firm* — Harness, Dickey & Pierce, P.L.C.

(57) ABSTRACT

A system includes a normal behavior characterization module configured to receive values for a first metric of a plurality of metrics and generate a baseline profile indicating normal behavior of the first metric based on the received values. The system also includes an anomaly identification module configured to identify an anomaly in response to present values of the metric deviating outside the baseline profile. The system also includes an anomaly behavior characterization module configured to analyze a plurality of prior anomalies identified by the anomaly identification module and develop a model of the anomalies of the first metric. The system also includes an anomaly scoring module configured to determine a first score for a present anomaly detected by the anomaly identification module for the first metric. The first score is based on characteristics of the present anomaly and the model of the anomalies of the first metric.

26 Claims, 14 Drawing Sheets

(56) References Cited

U.S. PATENT DOCUMENTS

| | | | | |
|---|---|---|---|---|
| 2008/0195369 A1* | 8/2008 | Duyanovich | ....... | G06F 11/0709 703/22 |
| 2013/0110761 A1* | 5/2013 | Viswanathan | ....... | G06N 99/005 706/52 |
| 2014/0195868 A1* | 7/2014 | Hasegawa | ............. | G06F 11/076 714/724 |
| 2014/0351642 A1* | 11/2014 | Bates | .................. | G06F 11/0709 714/26 |
| 2015/0033086 A1* | 1/2015 | Sasturkar | ............ | G06F 11/0709 714/57 |
| 2015/0120914 A1* | 4/2015 | Wada | ....................... | H04L 43/04 709/224 |

* cited by examiner

SYSTEM AND METHOD FOR TRANSFORMING OBSERVED METRICS INTO DETECTED AND SCORED ANOMALIES

CROSS-REFERENCE TO RELATED APPLICATIONS

This application claims the benefit of U.S. Provisional Application No. 62/083,850, filed on Nov. 24, 2014. The entire disclosure of the application referenced above is incorporated herein by reference.

FIELD

The present disclosure relates to systems and methods for transforming observed metrics into detected and scored anomalies, and more particularly to combining anomalous conditions across multiple metrics into combined anomalies.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modest computing systems can have hundreds or even thousands of processor cores, memory arrays, storage arrays, networking ports and additional peripherals. In large-scale computing systems such as a data center or supercomputer, the number of processor cores can be in the hundreds of thousands to millions. Each hardware component may have a number of associated parameters such as clock speed, temperature, idle time, etc. Some of these parameters may be reported and/or measured by the computing system itself. Other parameters may be monitored by an associated monitoring system.

These parameters are referred to in this disclosure as metrics and may be defined at a component level such as available space on a given magnetic disk or may be at a subsystem level such as amount of available storage space in a storage area network. Metrics may also be defined at a system level, such as number of transactions per second in the data base or delay in returning results for a query. A monitoring system for a large computing system may measure and/or collect thousands, millions, or even billions of time-series (that is, the metrics are measured over time) metrics. Monitoring metrics allows for problems to be quickly identified and resolved, hopefully before affecting business outcomes such as losing users, missing revenue, decreasing productivity, etc.

Currently, problems are detected by skilled system administrators who manually create rules to generate alerts for specific metrics. For example, an administrator may set a threshold for available disk space such that an alert will be generated when available disk space decreases below 10% of total disk space. For many metrics, the "correct" threshold may not be known a priori. Instead, the administrator may have to observe the metric over time and infer a threshold based on the historical metric values.

Administrators may watch scores of metrics, such as in a dashboard, and use experience and intuition to determine if any of the metrics indicate the onset of a problem. However, regardless of how many computer screens are used, the number of metrics that can be visually tracked is limited.

Further, manually setting rules is a tedious and difficult task. For example, some values of a metric may be associated with problems at some times but with normal operation at others. Sometimes this inconsistency can be resolved by combining metrics. For example, an alert can be defined for when processor utilization is above a first threshold and memory utilization is above a second threshold. However, these thresholds may vary over time and their interrelationship may vary depending on tasks the system is performing. When combining metrics, some relationships may be well understood by the administrator but others are less apparent, escaping the administrator's notice.

Because of the limitations of visual and programmatic oversight by human administrators, big data principles have been applied to the problem of monitoring systems. Automated processes may evaluate every single metric, a significant advance compared to the tiny fraction that a human administrator can review, and determine normal historical behavior for each metric. However, automated processes don't have the insight and experience of an administrator, and this insight generally has to be manually taught to the system.

Machine learning is able to calculate statistics of values of the metric over time and declare that an anomaly is present when the metric deviates from algorithmically-determined behavior. Of course, determining this behavior algorithmically means that false positives will occur as metrics drift over time at a slow rate and various circumstances, such as bursts of activity, lead to fluctuation at higher rates.

When a monitoring system is collecting millions of metrics, the number of false positives, even with a very low false positive rate, can quickly become noise from which a human administrator cannot detect the signal. As just one example, a recent security breach at a major retailer was detected by security monitoring software. However, these detections were mixed in with so many false positives that the security software's detection of the breach was only recognized after the breach was reported in the press.

SUMMARY

A system includes a normal behavior characterization module configured to (i) receive values for a first metric of a plurality of metrics and (ii) generate a baseline profile indicating normal behavior of the first metric based on the received values. The system also includes an anomaly identification module configured to identify an anomaly in present values of the first metric in response to the present values deviating outside the baseline profile. The system also includes an anomaly behavior characterization module configured to (i) analyze a plurality of prior anomalies identified by the anomaly identification module and (ii) develop a model of the anomalies of the first metric. The system also includes an anomaly scoring module configured to determine a first score for a present anomaly detected by the anomaly identification module for the first metric. The first score is based on characteristics of the present anomaly and the model of the anomalies of the first metric.

In other features, the system includes a reporting module configured to send an alert to a designated user in response to the first score exceeding a threshold. In other features, the normal behavior characterization module is configured to update the baseline profile in real-time as the values for the first metric are received. In other features, the anomaly behavior characterization module is configured to update the model of the anomalies of the first metric on a periodic schedule. In other features, the graph is undirected.

In other features, the system includes an anomaly combination module configured to selectively (i) combine the present anomaly detected for the first metric with anomalies presently experienced by other ones of the plurality of metrics to create a combined anomaly and (ii) determine an overall score for the combined anomaly based on scores for the metrics in the combined anomaly. In other features, the anomaly combination module is configured to determine the overall score based on a maximum value of the scores of the metrics in the combined anomaly.

In other features, the system includes a reporting module that graphically presents the overall score and selectively indicates the other ones of the plurality of metrics in the combined anomaly. In other features, the system includes a relationship data store configured to store information representing a graph in which the plurality of metrics are nodes in the graph and direct relationships between each pair of the plurality of metrics are edges in the graph. In other features, the other ones of the plurality of metrics used for the combined anomaly are limited to within at most N hops from the first metric in the graph. Each hop corresponds to one of the edges in the graph. N is an integer greater than zero.

In other features, the relationship data store is configured to store edge information indicating strengths of the direct relationships in the graph. The strength of a direct relationship between two nodes indicates how closely correlated the two nodes are to each other. In other features, the anomaly combination module is configured to determine the overall score such that an increase in the scores for the metrics in the combined anomaly corresponds to an increase in the overall score and an increase in a total number of edges connected to the metrics in the combined anomaly corresponds to a decrease in the overall score.

In other features, the anomaly combination module is configured to determine the overall score such that the overall score is based on a maximum value of the scores of the metrics in the combined anomaly raised to an exponent. The exponent is proportional to a ratio of a first quantity and a second quantity. The first quantity is proportional to a sum of the scores for the metrics in the combined anomaly. The second quantity is proportional to a sum, for each of the metrics associated with the overall score, of how many edges are connected to the metric.

In other features, the anomaly combination module is configured to determine the overall score such that the overall score is based on a maximum value of the scores of the metrics in the combined anomaly raised to an exponent. The exponent is inversely proportional to a ratio of a first quantity and a second quantity. The first quantity is directly proportional to a sum of the scores for the metrics in the combined anomaly. The first quantity is directly proportional to a sum of inverses of the edge information for edges connecting the metrics associated with the overall score with each other. The first quantity is inversely proportional to a count of the edges connecting the metrics associated with the overall score with each other. The second quantity is directly proportional to an average number of edges connected to the metrics associated with the overall score.

In other features, the model of the anomalies of the first metric includes (i) a statistical distribution of intensities of the anomalies with respect to the baseline and (ii) a statistical distribution of durations of the anomalies. In other features, the model of the anomalies of the first metric includes (i) a statistical distribution of relative intensities of the anomalies normalized to the baseline, (ii) a statistical distribution of absolute intensities of the anomalies relative to the baseline but normalized to a full range of the first metric, and (iii) a statistical distribution of durations of the anomalies.

In other features, the anomaly behavior characterization module is configured to distinguish, based on user feedback, at least one of (i) anomalies representing false positives and (ii) anomalies representing true positives. The anomaly behavior characterization module is further configured to at least one of (i) decrease contributions to the model from anomalies representing true positives compared to other anomalies and (ii) increase contributions to the model from anomalies representing false positives compared to other anomalies.

A method of monitoring a system that generates a plurality of metrics includes receiving values for a first metric of the plurality of metrics. The method further includes generating a baseline profile indicating normal behavior of the first metric based on the received values. The method further includes identifying an anomaly in present values of the first metric in response to the present values deviating outside the baseline profile. The method further includes analyzing a plurality of prior identified anomalies. The method further includes developing a model of the anomalies of the first metric. The method further includes determining a first score for a present anomaly detected for the first metric. The first score is based on characteristics of the present anomaly and the model of the anomalies of the first metric.

In other features, the method includes sending an alert to a designated user in response to the first score exceeding a threshold, updating the baseline profile in real-time as the values for the first metric are received, and updating the model of the anomalies of the first metric on a periodic schedule. In other features, the method includes selectively (i) combining the present anomaly detected for the first metric with anomalies presently experienced by other ones of the plurality of metrics to create a combined anomaly and (ii) determining an overall score for the combined anomaly based on scores for the metrics in the combined anomaly.

In other features, the overall score is determined based on a maximum value of the scores of the metrics in the combined anomaly. In other features, the method includes graphically presenting the overall score and selectively indicating the other ones of the plurality of metrics in the combined anomaly. In other features, the method includes storing information representing a graph in which the plurality of metrics are nodes in the graph and direct relationships between each pair of the plurality of metrics are edges in the graph.

In other features, the other ones of the plurality of metrics used for the combined anomaly are limited to within at most N hops from the first metric in the graph. Each hop corresponds to one of the edges in the graph. N is an integer greater than zero. In other features, the graph includes edge information indicating strengths of the direct relationships in the graph. The strength of a direct relationship between two nodes indicates how closely correlated the two nodes are to each other. In other features, the overall score is determined such that an increase in the scores for the metrics in the combined anomaly corresponds to an increase in the overall score and an increase in a total number of edges connected to the metrics in the combined anomaly corresponds to a decrease in the overall score.

In other features, the overall score is determined such that the overall score is based on a maximum value of the scores of the metrics in the combined anomaly raised to an exponent. The exponent is proportional to a ratio of a first quantity and a second quantity. The first quantity is proportional to a sum of the scores for the metrics in the combined anomaly. The second quantity is proportional to a sum, for each of the metrics associated with the overall score, of how many edges are connected to the metric.

In other features, the overall score is determined such that the overall score is based on a maximum value of the scores of the metrics in the combined anomaly raised to an exponent. The exponent is inversely proportional to a ratio of a first quantity and a second quantity. The first quantity is directly proportional to a sum of the scores for the metrics in the combined anomaly. The first quantity is directly proportional to a sum of inverses of the edge information for edges connecting the metrics associated with the overall score with each other. The first quantity is inversely proportional to a count of the edges connecting the metrics associated with the overall score with each other. The second quantity is directly proportional to an average number of edges connected to the metrics associated with the overall score.

In other features, the model of the anomalies of the first metric includes (i) a statistical distribution of intensities of the anomalies with respect to the baseline and (ii) a statistical distribution of durations of the anomalies. In other features, the graph is undirected. In other features, the model of the anomalies of the first metric includes (i) a statistical distribution of relative intensities of the anomalies normalized to the baseline, (ii) a statistical distribution of absolute intensities of the anomalies relative to the baseline but normalized to a full range of the first metric, and (iii) a statistical distribution of durations of the anomalies.

In other features, the method includes distinguishing, based on user feedback, at least one of (i) anomalies representing false positives and (ii) anomalies representing true positives. The method further includes at least one of (i) decreasing contributions to the model from anomalies representing true positives compared to other anomalies and (ii) increasing contributions to the model from anomalies representing false positives compared to other anomalies.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The present disclosure describes elements of a system and method that automatically detect significant abnormal behaviors across multiple metrics. In various implementations, much of the data regarding the metrics, their significance, their relationships, their normal and abnormal behaviors, etc., are inferred automatically. This minimizes the burden on system administrators, allowing an anomaly detection system according to the present disclosure to be quickly and simply integrated with existing monitoring systems.

For example, the names of all the monitored metrics may be provided to the anomaly detection system and then the values of each of the metrics are provided as those values are measured. The anomaly detection system may require no additional data beyond the names and values of the metrics. Further, in various implementations the names may convey no actual data to the anomaly detection system, serving only to label the metrics for identification by users of the anomaly detection system.

In various implementations, a dependency graph may also be provided to the anomaly detection system. The dependency graph describes the relationship between the metrics and may also indicate the strength of the relationships. Each metric may be represented in the graph as a node and each edge between two nodes signifies that the metrics of those nodes are related in some way. The weight on the edge describes the strength of that relationship. In one example, the weight is a number between zero and one, with the weight increasing toward one when the metrics are more closely related and the weight decreasing toward zero when the metrics are less related. For example, the weight may be based on the absolute value of the statistical correlation between the metrics. In some implementations, a weight of zero may not exist because in that situation the edge is simply removed.

Based on the values received for a metric, the anomaly detection system automatically establishes a baseline for normal behavior of the metric. The anomaly detection system then determines when deviations from the baseline have occurred, which are labeled as anomalies, and characterizes the anomalies of the metric. This characterization is referred to as learning the metric's abnormal behavior.

Then, as values for the metric continued to be received, the anomaly detection system determines whether an anomaly is present for a metric and determines a significance of the anomaly based on the characterized abnormal behavior. A score may be assigned to the anomaly representing the significance of the anomaly and other metrics also experiencing anomalies may be combined with the metric being evaluated. Metrics may be combined according to the dependency graph and the weights connecting the metrics in the dependency graph may be used to determine an overall score for the combined anomaly.

Figure 1:
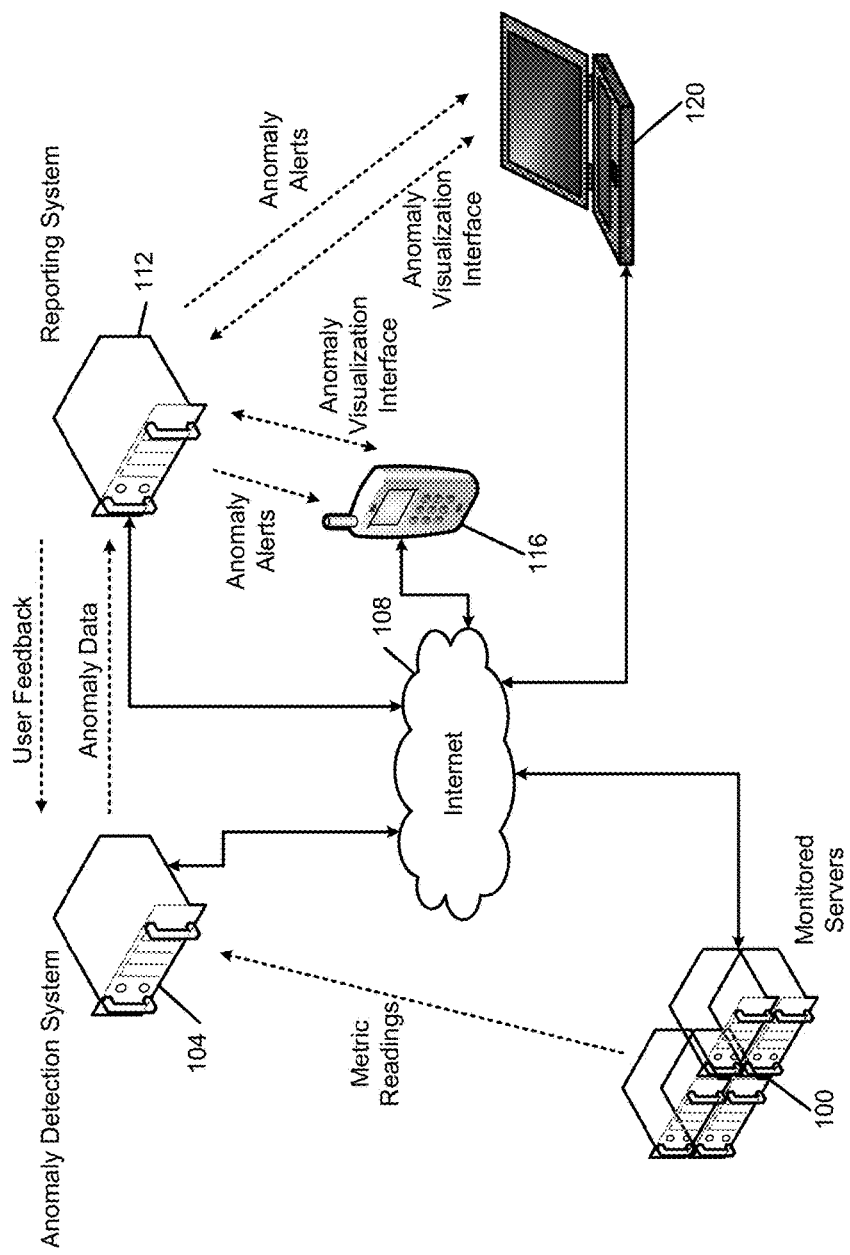
FIG. 1 is a graphical depiction of example elements in a monitored system and the corresponding monitoring system.

In FIG. 1, a set of monitored servers 100 is shown as an example of infrastructure to be monitored. The monitored servers 100 may include production servers as well as monitoring servers that measure metrics of the production servers. Some metrics may be generated and reported automatically while others are measured externally.

Although depicted as computing servers, monitored hardware can include not just computers but other hardware and software capable of instrumentation. For example, industrial control systems, factory automation, etc., may all generate and/or be observed to generate a number of metrics that can be evaluated by an anomaly detection system 104. Further, even within computing hardware, the monitored servers 100 could alternatively or additionally include desktop computers, smartphones, tablets, dedicated hardware (storage area networks, voice-over IP systems), etc.

The monitored servers 100 may be physical servers, virtual servers, hosted servers, etc. In one example, the monitored servers 100 may be instances in an Amazon Web Services (AWS), and Elastic Cloud Compute (EC2). As shown in FIG. 1 with a dashed line, metric readings are transmitted from the monitored servers 100 to the anomaly detection system 104.

Physically, the metric readings may be transported over the internet represented at 108 or over any other communication system. The metric readings will generally be encrypted when sent over the internet 108, such as by using a Virtual Private Network (VPN) or some other secure transport facility such as Secure File Transfer Protocol (SFTP) or Hypertext Transfer Protocol Secure (HTTPS).

The anomaly detection system 104 analyzes the metric readings and, as described in more detail below, characterizes normal and abnormal behavior and determines the significance of detected anomalies. This anomaly data is transmitted to a reporting system 112, which can generate anomaly alerts to system administrators. For example, these anomaly alerts may be sent via text message to a mobile phone 116 or by email or through a monitoring dashboard interface to a laptop 120.

The anomaly detection system 104 and the reporting system 112 may be integrated together and simply referred to as the anomaly detection system 104. They are shown separately in FIG. 1 simply for ease of illustrating their respective functionality. The anomaly detection system 104 and the reporting system 112 may be hosted on dedicated hardware or in cloud computing instances. The data they store may also be stored in dedicated hardware or in cloud storage, such as AWS Simple Storage Service (S3) and/or AWS Elastic Block Store (EBS).

The anomaly detection system 104 and the reporting system 112 may be owned and operated by the provider of the anomaly detection system 104 through a service agreement. Alternatively, the anomaly detection system 104 and the reporting system 112 may be purchased as hardware or as virtual machines and then operated by the owner of the monitored servers 100.

Figure 8:
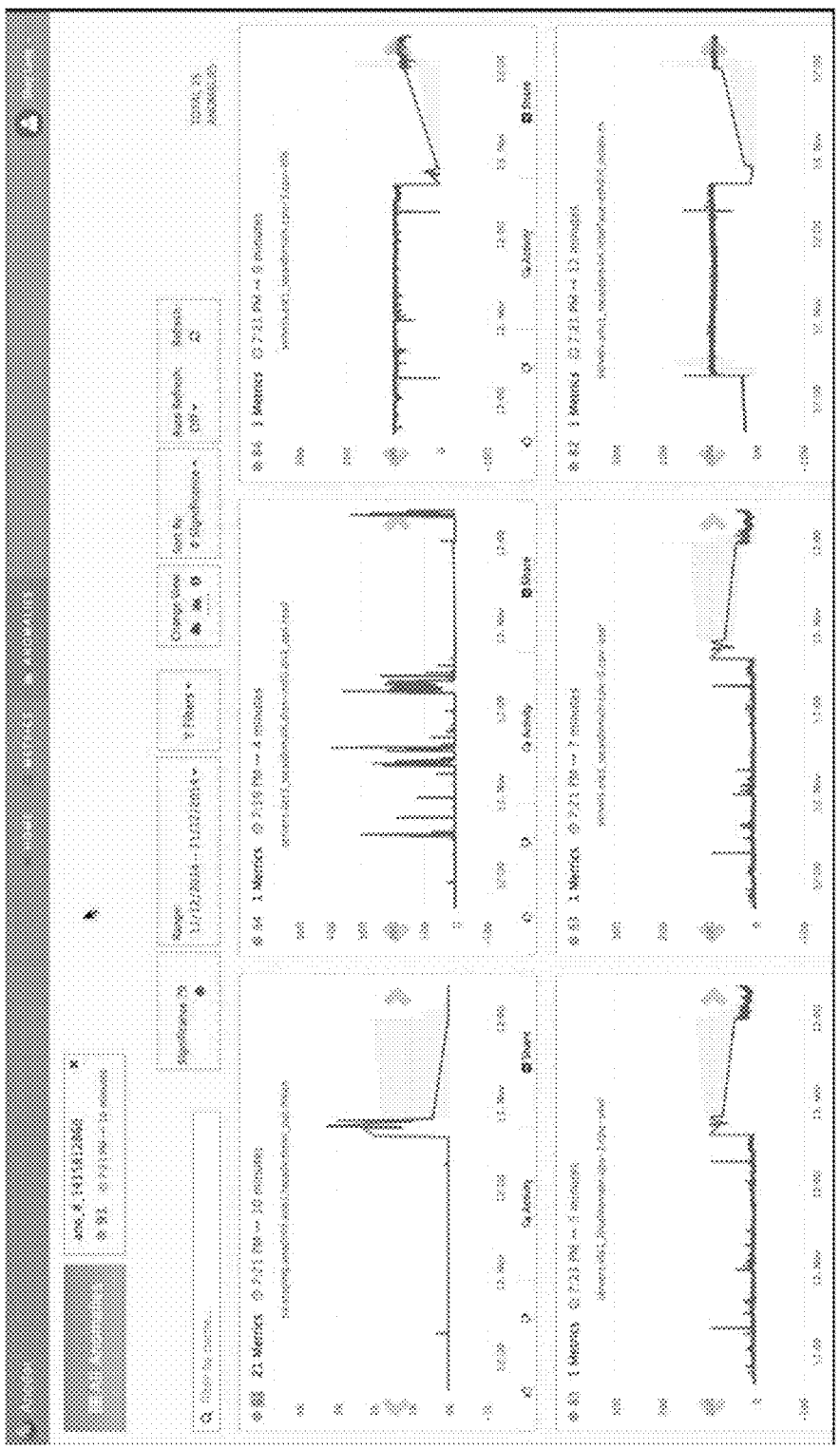
FIG. 8 is an example user interface depicting six detected anomalies in one example view.
Figure 9:
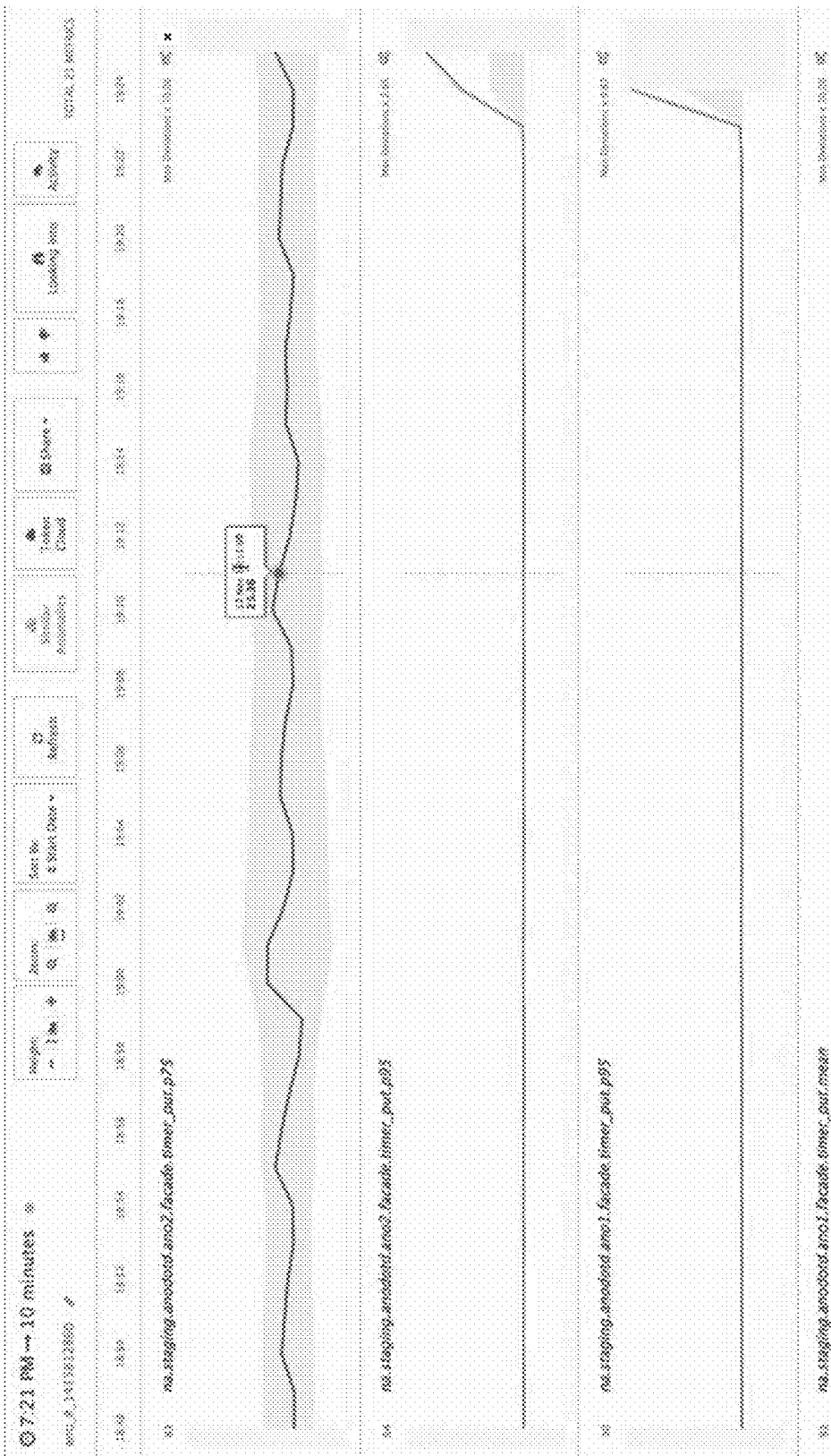
FIG. 9 is an example user interface display depicting multiple metrics associated with a combined anomaly.

The mobile phone 116 interacts with an anomaly visualization interface presented by the reporting system 112. This interface may allow active anomalies to be seen in real time and may allow prior anomalies to be evaluated. A small subset of example interface screens for the anomaly visualization interface is shown in FIGS. 8 and 9.

A user of the mobile phone 116 may provide feedback on various reported anomalies to the reporting system 112. For example, this feedback may identify an anomaly as representing a false positive or a true positive. A false positive means that the anomaly does not actually represent anomalous behavior or at least does not indicate an actual or impending issue. Meanwhile, a true positive would mean that the detected anomaly corresponded with some issue with the monitored servers 100.

The laptop 120 may also access the anomaly visualization interface. The interface may be tailored to different screen sizes such as by limiting the information provided to the mobile phone 116 to more significant information than might be shown to the laptop 120. The mobile phone 116 and the laptop 120 may be owned by system administrators employed by the owner of the monitored servers 100 or may be owned by the provider of the anomaly detection system 104 or a third party. Such a third party could monitor for anomalies and report to the owner of the monitored servers 100 when a problem appears to be occurring or expected.

The detected anomalies may signify, and be used to examine, a wide variety of issues. These issues include uptime and reliability, security, responsiveness to users, efficient resource usage, business trends, etc.

Figure 2:
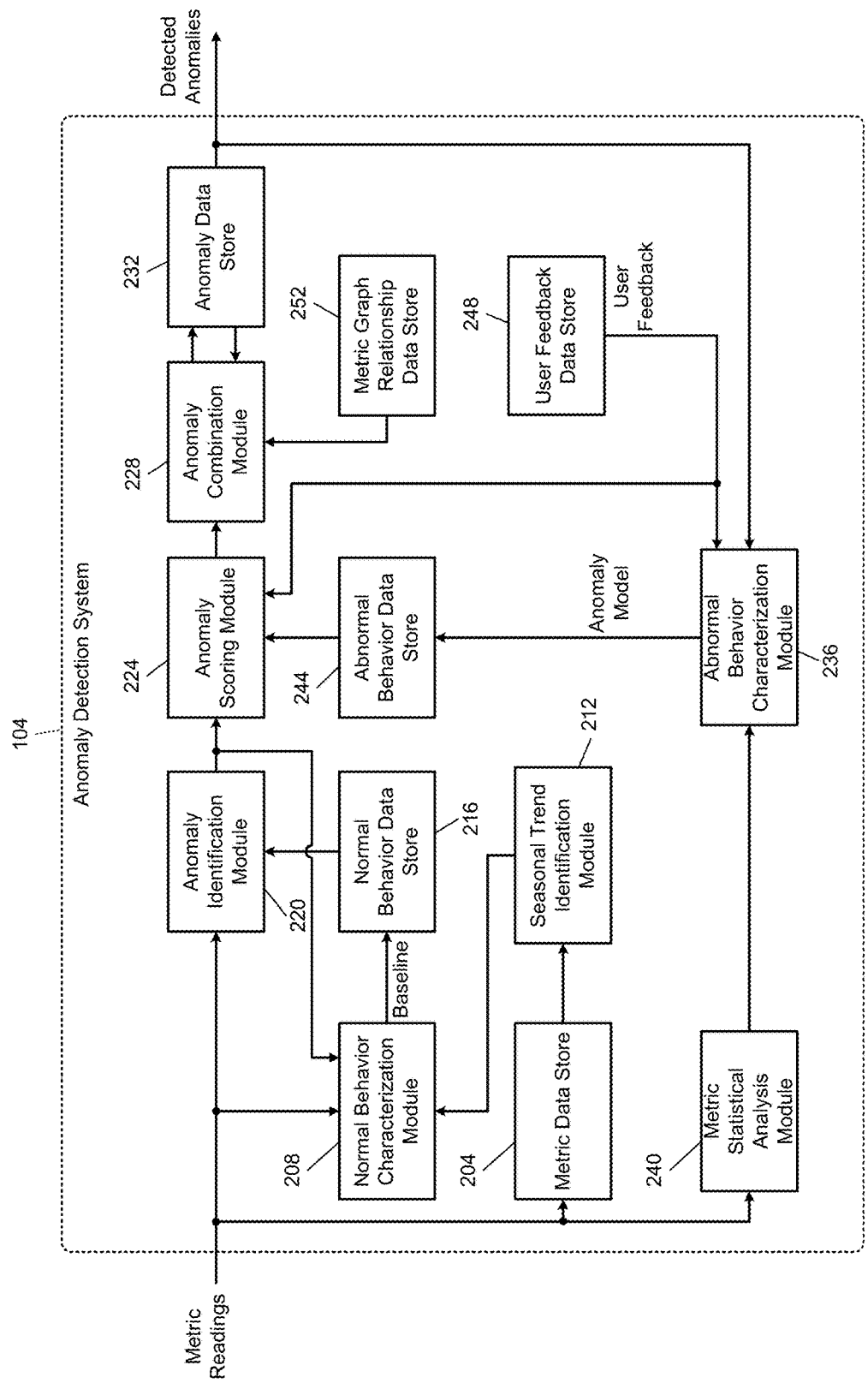
FIG. 2 is a functional block diagram of an example implementation of an anomaly detection system.

In FIG. 2, an example implementation of the anomaly detection system 104 is shown. Metric readings are received by the anomaly detection system 104 and stored in a metric data store 204. The metric readings are also processed by a normal behavioral characterization module 208 described in more detail in FIG. 3.

A seasonal trend identification module 212 may analyze readings of a metric over a period of time such as days, weeks, or months, and identifies whether there are seasonal trends in the metric. Seasonal trends may, for example, identify that each seven day period contains five consecutive days where activity for the metric is higher than the remaining two days. Of course, this likely corresponds to the standard five-day work week.

The seasonal trend identification module 212 may also determine that twenty-four hour cycles are present where the expected value of the metric may differ depending on the time of day. In various implementations, these seasonal trends may be entirely determined empirically, with no information provided to the seasonal trend identification module 212 about the existence of seven-day weeks, twenty-four hour days, etc.

Based on seasonal trends and the observed metric readings, the normal behavior characterization module 208 determines a baseline for the metric. This baseline is stored in a normal behavior data store 216. The normal behavior data store 216 may store a model of the baseline along with whatever seasonal adjustments to the baseline may be necessary. The baseline may be a function of time, and may define a range of expected values for each point in time. For example, the baseline may define an upper bound and a lower bound. In various implementations, the normal behavior characterization module 208 calculates a logarithm (such as a base 10 logarithm or the natural logarithm) of the metric and determines a logarithmic baseline for the logarithmic metric as well.

An anomaly identification module 220 can then use the model from the normal behavior data store 216 to determine what the readings of a metric should be and identify deviations from that expected baseline. When an anomaly in a metric is identified, this detection is provided to an anomaly scoring module 224. For example, a metric may be defined as being anomalous when it rises above an upper bound of the baseline or falls below a lower bound of the baseline.

In various implementations, the anomaly identification module 220 may compare the metric to the baseline and may also compare a logarithm of the metric to the logarithmic baseline. An excursion of either the metric or the logarithmic metric from outside of the range of the respective baseline may be determined to be an anomaly. As a mathematical approximation, the logarithmic baseline may be exponentiated to allow direct comparison with the metric.

In some situations, the ranges of the baseline and the logarithmic baseline may have no "overlap," or only minimal overlap—in other words, no value for the metric could satisfy both the baseline and, in its logarithmic form, the logarithmic baseline at the same time. In such situations, one of the bounds may be relaxed. In other words, the bound may be ignored for purposes of detecting an anomaly until the ranges of the baseline and the logarithmic baseline once again have sufficient overlap. As a specific example, the upper bound of the logarithmic baseline may be ignored, meaning that an excursion of the logarithm of the metric above the upper bound of the logarithmic baseline is not considered to be an anomaly. The bound to be ignored may be selected such that the acceptable range of values for the metric remains as small as possible.

In other implementations, only one lower bound and one upper bound may be used. In one specific example, the lower bound of the logarithmic metric may constrain the metric on the low end, while the upper bound of the (non-logarithmic) metric constrains the metric on the high end. When these bounds cannot be simultaneously satisfied (meaning that the ranges of the metric and the logarithmic metric do not overlap), one of the bounds may be switched. For example, the metric may be constrained on the high end by the logarithmic metric instead of by the non-logarithmic metric. Or, the metric may be constrained on the low end by the non-logarithmic metric instead of by the logarithmic metric. These options may be selected based on which provides a smaller envelope within which the metric must remain.

The anomaly scoring module 224 determines a score for the detected anomaly based on how significant the anomaly appears. As the intensity of the anomaly increases (that is, the amount of deviation of the metric away from the baseline), and as the duration of the anomaly increases, the score correspondingly increases. An anomaly combination module 228 combines the score for the single metric calculated by the anomaly scoring module 224 along with the scores of other detected anomalies. These scores and other characteristics of other anomalies are stored in an anomaly data store 232.

The anomaly data store 232 provides details of anomalies for other metrics to the anomaly combination module 228 and also stores scores and data related to combined anomalies as determined by the anomaly combination module 228. The anomaly data store 232 also provides information about the detected anomalies to, for example, the reporting system 112 of FIG. 1.

The detected anomalies are analyzed by an abnormal behavior characterization module 236 to determine a model of anomalies experienced by each metric. A metric statistical analysis module 240 may determine statistics for each metric, such as absolute minimum value, absolute maximum value, mean, median, standard deviation, etc. The absolute minimum and maximum values determine a range within the metric operates. For example, a metric of CPU utilization will generally range between 0% and 100%.

The metric statistical analysis module 240 allows the anomaly detection system 104 to determine these ranges without explicit input from operators of the monitored servers 100. Using statistical analysis, the metric statistical analysis module 240 can determine that, for example, a metric of CPU utilization varies between 0 and a number close to 100 while a query response time varies between 40 and 3000 (which may represent time and milliseconds).

The abnormal behavior characterization module 236 analyzes anomalies for a metric from the anomaly data store 232 and statistical values for the metric from the metric statistical analysis module 240 and generates an anomaly model for storage in an abnormal behavior data store 244.

The anomaly model may also be based on user feedback from a user feedback data store. For example, anomalies identified by the user as being less significant or not representative of actual problems may be weighted more heavily in determining the anomaly model. The anomaly scoring module 224 uses the anomaly model for the metric for the abnormal behavior data store 244 to determine how significant a given anomaly is. For example, if the intensity of the detected anomaly is greater than the typical anomaly for the metric, this is an indication of greater significance. Further, if the duration of the anomaly has already exceeded an expected value of anomaly duration, this is yet another indication of significance of the anomaly.

When combining multiple anomalies into a single combined anomaly, relationships between the metrics are specified by a metric graph relationship data store 252. As described in more detail below, when multiple anomalies are present across related metrics, this may be an indication of greater significance of the combined anomaly.

Figure 3:
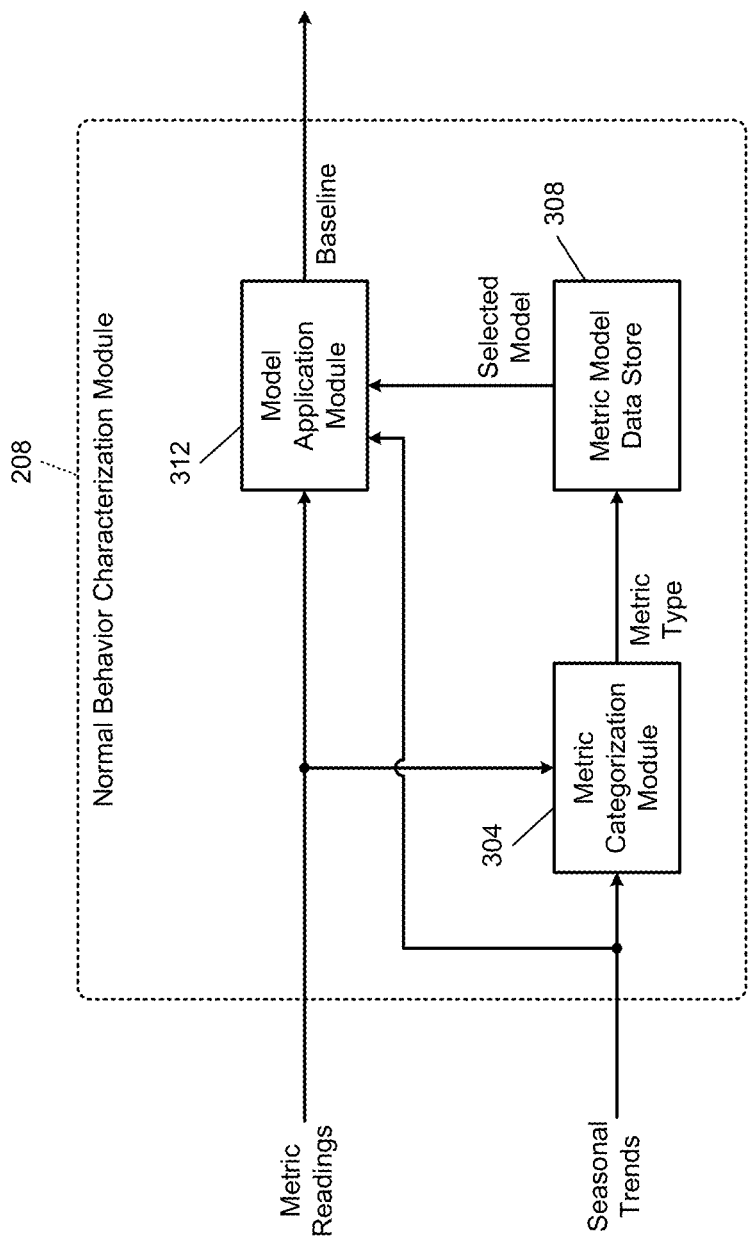
FIG. 3 is a functional block diagram of an example implementation of a normal behavior characterization module.
Figure 4:
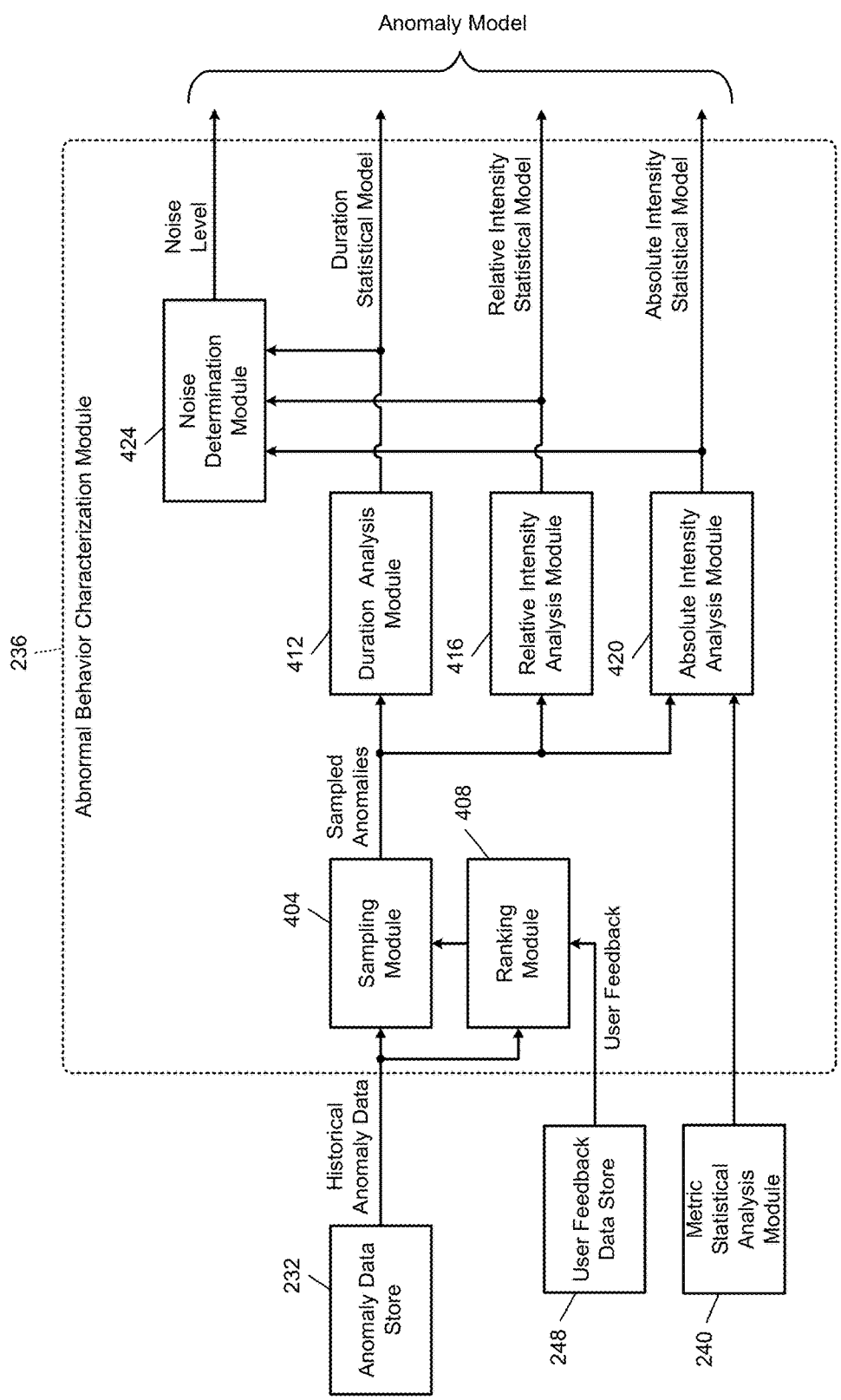
FIG. 4 is a functional block diagram of an example implementation of an abnormal behavior characterization module.

In FIG. 3, an example implementation of the normal behavior characterization module 208 includes a metric categorization module 304 that identifies heuristically what type of normal behavior to expect from the metric. Seasonal trend information may be received by the metric categorization module 304, which may normalize by seasonal trend to remove the seasonal contribution prior to determining metric type.

As mentioned above, metrics can take many forms and measure varying levels of abstraction from the hardware. A small subset of example metrics includes server metrics (temperatures, voltage, uninterruptible power supply charge level, etc.), operating system metrics (CPU utilization, I/O throughput, memory usage, memory throughput, network bandwidth, etc.), application metrics (response time of software methods, number of network connections, number of concurrent users, memory consumed per application, etc.), and business-related metrics (number of users performing a given action, number of users per location, number of devices of a certain class such as smartphones).

Each of these metrics may lend themselves to description by a certain model. The metric categorization module 304 determines what type of metric the readings imply and a metric model data store 308 supplies a corresponding selected model to a model application module 312. The model application module 312 then determines what parameters of the selected model best match the received metric readings. The complete model is then used as a baseline of the metric's normal behavior.

The metric model data store 308 may be pre-populated with different model types observed across a number of systems. As additional types of metrics are observed, the metric model data store 308 and the metric categorization module 304 may be updated.

The metric readings for a given metric may not be received periodically. For example, an irregular metric may be reported only when the value of the metric changes. Metric readings, for irregular metrics and for other metrics, may be rare, being received only once on the order of minutes, hours, days, etc. The metric may be described as sparse where the metric reports a certain value for much of the time and occasionally transitions to a different value. For example, the number of pending errors may remain at zero for much of the time and jump occasionally to one.

A step metric may transition between different non-continuous values such as staying at ten for a period of time and then moving immediately to fifteen. Other metrics may behave like enumerated values transitioning between a subset of numbers such as zero, one, three, and five or between enumerated strings such as 'high', 'medium', and 'low'. Other metrics may appear to be constant if the reading of the metric has not changed during the time it has been analyzed.

For a constant metric, the baseline itself may be a constant, with any deviation of the metric from that constant baseline representing an anomaly. A step metric may correspond to a metric model that establishes a range outside of which the step metric generally does not operate. However, the baseline may also incorporate the fact that only certain values are observed and other values may represent an anomaly.

Sparse metrics may also be subject to a constant baseline with deviations from the baseline considered an anomaly. Many metrics may be modeled as one of a set of distributions including a Gaussian distribution and an exponential distribution. The model application module 312 determines the statistical parameters of the distribution based on the metric readings.

As metric readings continue to be received, the model application module 312 updates the baseline in real time. Real time means that, subject to the limits of processing delay, new metric readings are reflected in the baseline and used to analyze any subsequently-received metrics. In other limitations, the baseline may be updated on a periodic schedule, such as once a day, once a week, etc., or adaptively, such as when processing time is more available and/or cheaper.

As metric readings are received, the model application module 312 adjusts the baseline to account for the changes in the metric readings. However, during a period where the metric is determined to be anomalous, the model application module 312 may reduce or slow the adaptation based on the metric readings. In this way, the baseline is not expanded to encompass anomalies. In various implementations, during an anomaly condition for a metric, the model application module 312 ignores the metric readings.

The metric categorization module 304 may operate periodically and/or in real time to determine whether the inferred type of a metric has changed based on additional, recent readings. If so, the metric categorization module 304 instructs the metric model data store 308 to provide a new model to the model application module 312. The model application module 312 may then parse previous metric readings (which may be obtained from the metric data store 204 of FIG. 2) according to the newly selected model. The model application module 312 also incorporates the seasonal trend information so that the baseline tracks the observed seasonal trends.

In FIG. 3, an example implementation of the abnormal behavior characterization module 236 analyzes anomaly data from the anomaly data store 232. A sampling module 404 selects anomalies from the anomaly data store 232 for analysis. A ranking module 408 may rank the anomalies and assign varying weights to the anomalies.

The sampling module 404 may then sample the anomalies according to their weight. This allows more significant anomalies to contribute more to the anomaly characterization. For example, the weights may be correlated with the intensity of the anomalies, giving a higher weight to a higher intensity anomaly.

The sampling module 404 then samples anomalies from the weighted set of anomalies and anomalies with higher weights will be more likely to be sampled. In various limitations, the sampling may be performed with replacement, meaning that the same anomaly may be chosen more than once for analysis. Conversely, some anomalies may not be sampled at all.

The ranking module 408 may also incorporate user feedback, increasing the weights of anomalies indicated by a user as being false positives and decreasing the weight of anomalies indicated by the user as being true positives.

From the sampled anomalies, a duration analysis module 412 analyzes the durations of the sampled anomalies from the sampling module 404. For example, a statistical distribution of the durations of sample anomalies may be determined. The distribution may be chosen as an exponential, which may be a good fit for anomaly duration because of the long tail, asymmetric, and low-computation-cost characteristics of the exponential distribution.

Other distributions, such as a Gaussian distribution, may be used, or the distribution may be non-parametric, such as a histogram. In various implementations, different respective distributions may be defined for metrics that deviate both above and below the baseline. For example, deviations above the baseline may be characterized by an exponential distribution, while deviations below the baseline may be characterized by a Gaussian distribution.

The duration statistical model generated by the duration analysis module 412 forms part of an anomaly model for the metric. A relative intensity analysis module 416 determines a distribution of anomaly intensity based on the relative intensity of the anomaly. Relative intensity may be measured as percentage deviation from the expected range of the metric as specified by the baseline.

The relative intensity may be calculated based on the peak deviation of the metric from the baseline over the course of the metric. Alternative, the relative intensity may be based on multiple values of deviation from the baseline, such as by integration between the baseline and the metric values along the course of the anomaly. A relative intensity statistical model generated by the relative intensity analysis module 416 forms part of the anomaly model for the metric.

An absolute intensity analysis module 420 generates a statistical model of absolute intensity of the metric. Instead of being expressed as a percentage deviation from the baseline, the absolute intensity may be normalized by the full range of values that the metric can assume. For example, the absolute intensity may be normalized to a scale from 0 to 1 where a processor utilization that varies between 0 and 100 would be divided by 100. The absolute intensity and these implementations is therefore an expression of how large the deviation is with respect to the entire range of the metric as opposed to how large the deviation is with respect to the metric baseline (referred to as irrelative intensity). The absolute intensity statistical model forms part of the anomaly model for the metric. A noise determination module 424 may characterize the amount of anomaly noise for the metric. Noise in this context can refer to a large number of short-duration anomalies that do not exceed the baseline by a large amount. When the noise level is high, detected anomalies may be more likely to be insignificant and therefore the noise level may be used as part of the anomaly model to decrease the score of an anomaly for a metric with a high noise level.

Figure 5:
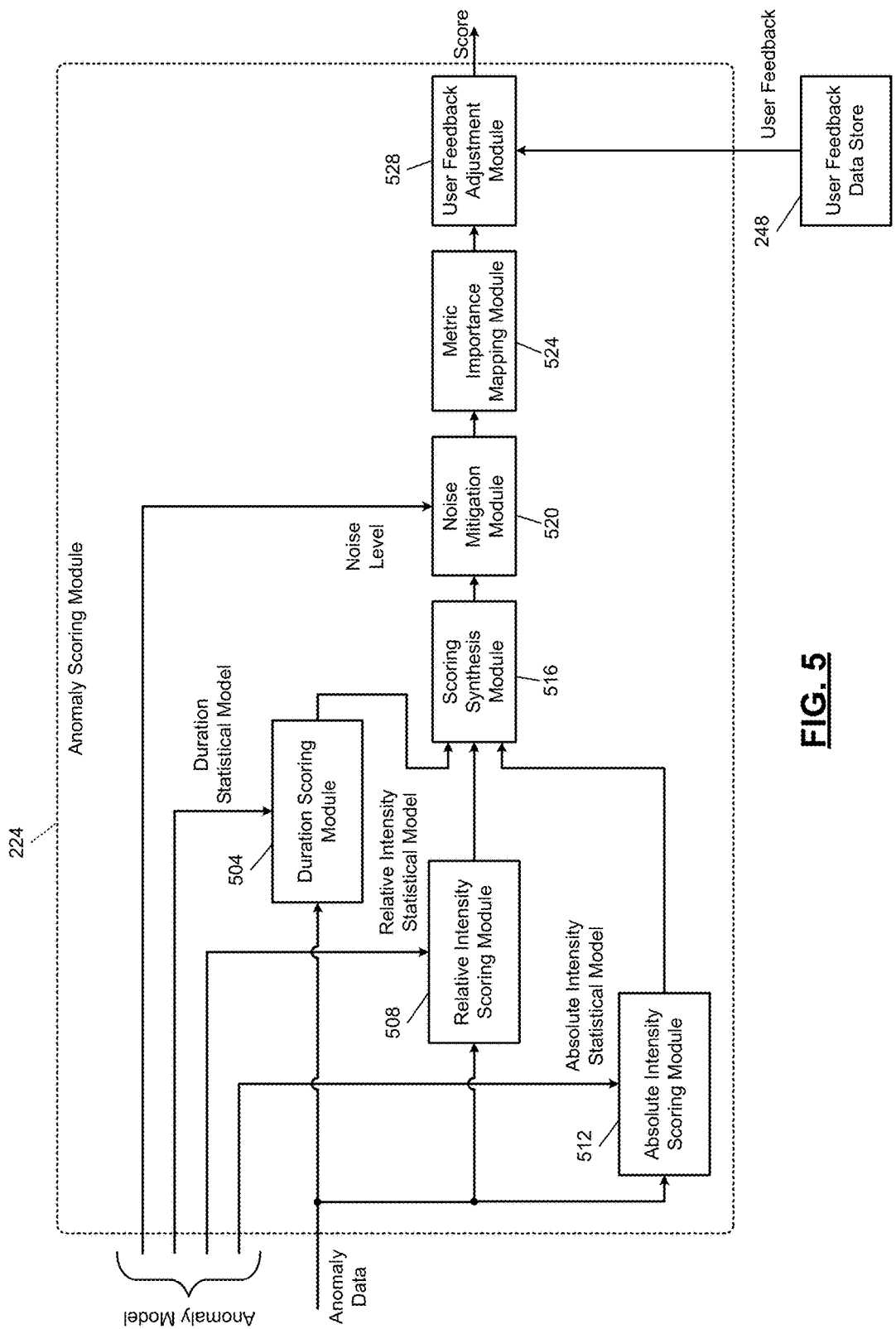
FIG. 5 is a functional block diagram of an example implementation of an anomaly scoring module.

In FIG. 5 an example implementation of an anomaly scoring module 224 receives the anomaly model for a first metric from the abnormal behavior characterization module 236. Based on anomaly data from the anomaly identification module 220 (in FIG. 2), a duration scoring module 504 generates a score representing how significant the length of the present anomaly is compared to the duration statistical model of prior anomalies.

For example, a cumulative density function of the duration statistical model indicates what proportion of prior anomalies are less than a given duration. As the duration of the present anomaly increases, the percentage of previous anomalies having a shorter duration than the present anomaly increases. The score generated by the duration scoring module 504 increases as the present anomaly duration begins to represent one of the longer anomaly durations previously observed.

A relative intensity scoring module 508 compares the relative intensity of the present anomaly as reported by the anomaly identification module 220 to the relative intensity statistical model and provides a score based on how significant the present relative intensity is compared to past anomalies.

An absolute intensity scoring module 512 determines a score based on the significance of the present absolute intensity from the anomaly data with respect to the absolute intensity statistical model. A scoring synthesis module 516 combines the scores from the duration scoring module 504, the relative intensity scoring module 508, and the absolute intensity scoring module 512 into a single score.

For example, the values from the relative intensity scoring module 508 and the absolute intensity scoring module 512 may be combined first and then combined with the value from the duration scoring module 504. Scores can be combined using an arithmetic mean, a harmonic average, a weighted average, etc.

A noise mitigation module 520 reduces the synthesized score from the scoring synthesis module 516 based on the noise level of the anomaly model, with increasing reductions being made for higher noise levels. In various other implementations, the noise mitigation module 520 may operate on the scores from the relative intensity scoring module 508 and the absolute intensity scoring module 512 before a resulting intensity score is combined with the score from the duration scoring module 504 by the scoring synthesis module 516.

A metric importance mapping module 524 may scale the score from the noise mitigation module 520 differently according to the importance of the metric. For example, business metrics, such as number of customers or delay in responding to a user query, may be considered more important than a hardware metric such as processor utilization. Metric importance may be specified by a user of the anomaly detection system or may be determined, for example, according to metric type by the normal behavior characterization module 208 of FIG. 3.

For example only, the metric importance mapping module 524 may apply a single-variable function to the incoming variable based on the importance of the metric. In one example, an exponential function may be applied that decreases the score for lower scores but leaves the score relatively unchanged for the highest scores.

The user feedback adjustment module 528 further adjusts the score based on user feedback from the user feedback data store 248. When anomalies of a metric are consistently indicated by a user as being false positives, the score may be reduced. Alternatively, when the user indicates that anomalies associated with the metric are indicative of true positives, the score may consequently be increased.

Figure 6:
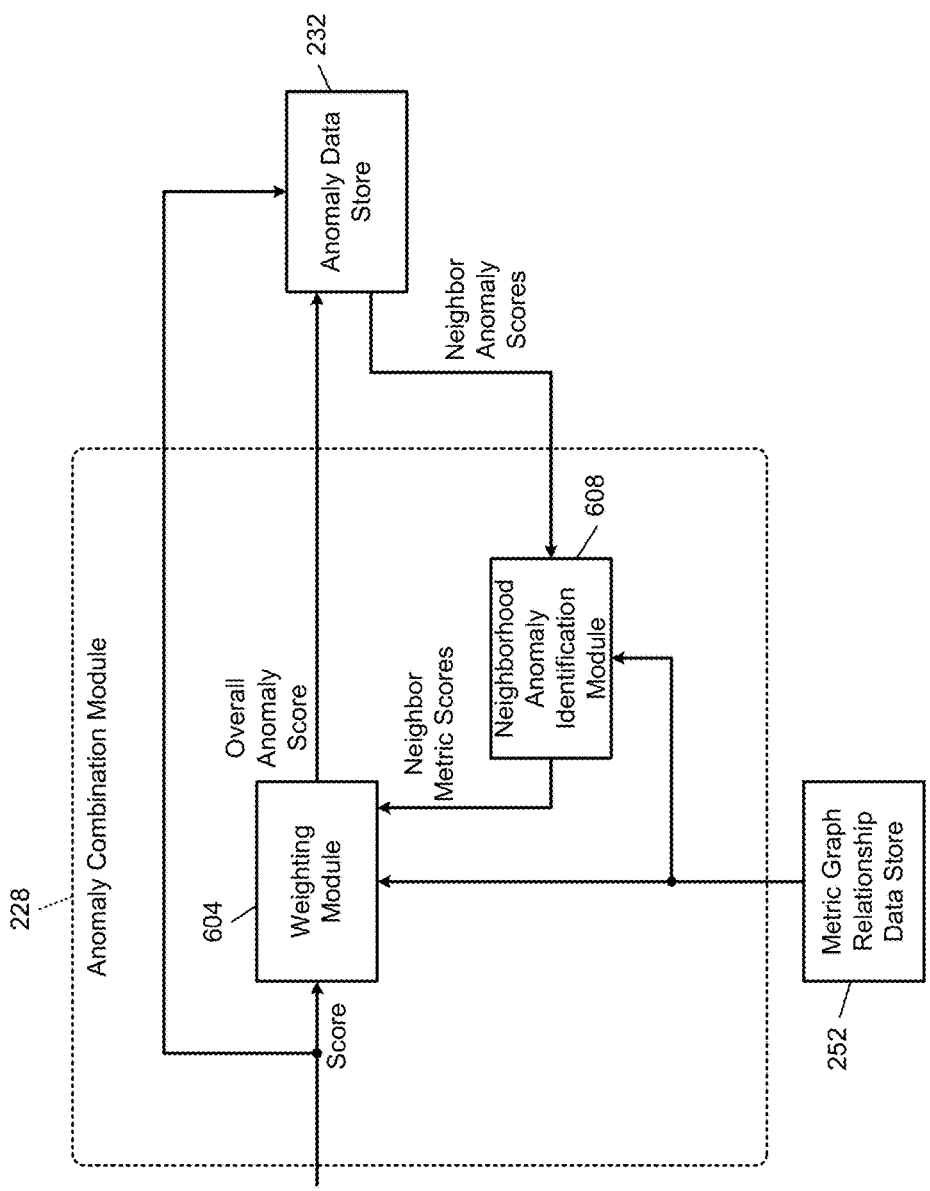
FIG. 6 is a functional block diagram of an example implementation of an anomaly combination module.

In FIG. 6, an example implementation of the anomaly combination module 228 receives the score from the anomaly scoring module 224. A weighting module 604 combines the score corresponding to the first metric with scores from neighbor metrics to produce an overall anomaly score. In addition, the score from the first metric is stored in the anomaly data store 232.

A neighborhood anomaly identification module 608 identifies a subset of metric nodes from the metric graph relationship data store 252 that are considered to be neighbors of the first metric. The first metric is the metric analyzed by the anomaly scoring module 224 as being anomalous. For example, the neighborhood anomaly identification module 608 may determine that metrics within two hops of the first metric are part of the same anomaly.

The number of hops refers to the number of edges connecting between one metric and another. The neighborhood anomaly identification module 608 may identify all metric nodes within two hops of the first metric and then determine if any of those neighbor metrics are experiencing an anomaly based on the anomaly data store 232. Those neighbor metrics that are experiencing an anomaly have their scores provided to the weighting module 604.

While the neighborhood is described as being two hops or fewer from the first metric, other definitions of the neighborhood can be used, such as by specifying a different number of hops. Alternatively, the neighborhood may be defined as any metrics experiencing anomalies that are connected to the first metric as well as any metrics experiencing anomalies that are connected to the metrics one hop away from the first metric. This neighborhood may expand until all anomalous metrics that are interconnected are combined within a single anomaly. In practical implementations, an outer boundary may be set on this growth since a graph might have two hundred thousand nodes with twenty million edges.

The weighting module 604 then combines the neighbor metric scores with the first metric score to produce the overall anomaly score. The weighting may be based, at least in part, on the edge values between the metrics as specified by the metric graph relationship data store 252. Additional details are provided with reference to FIG. 7.

Figure 7:
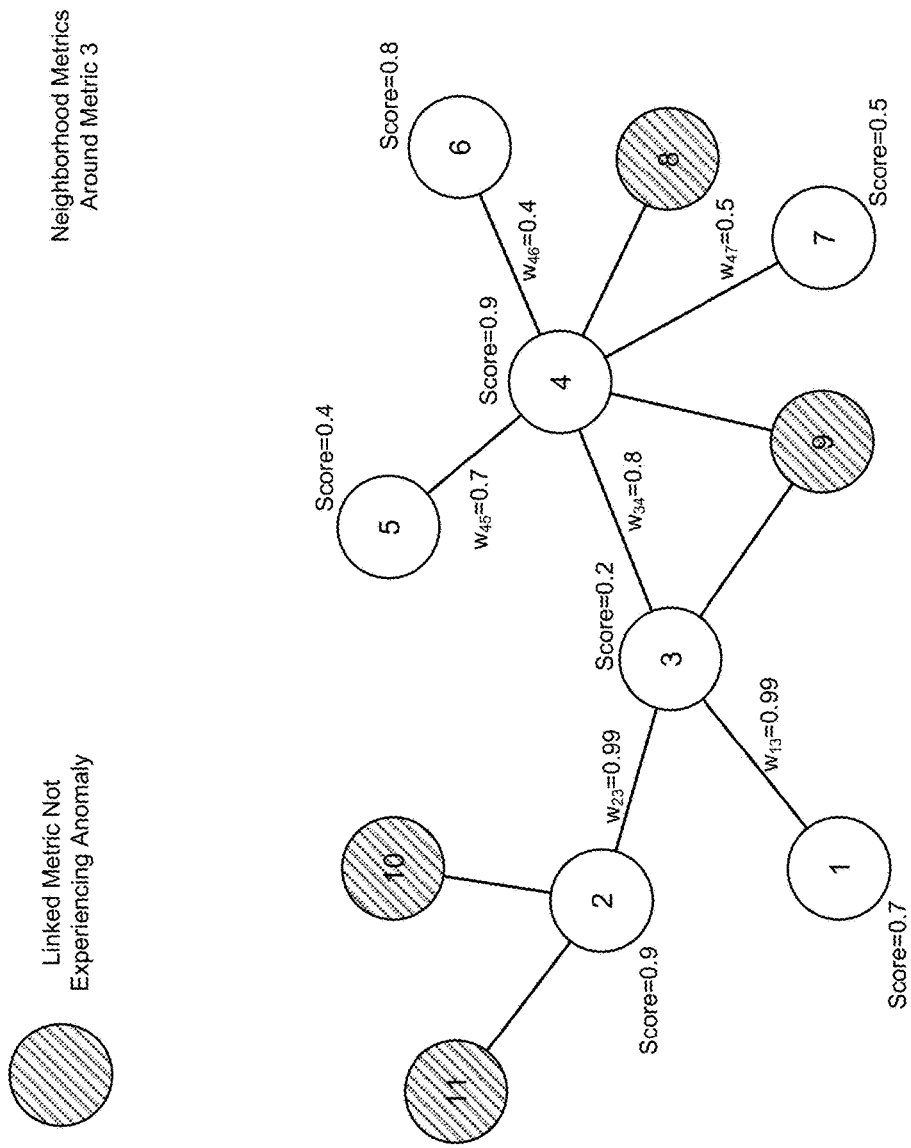
FIG. 7 is a graphical depiction of a subset of a metric graph for neighbors or metric number three.

In FIG. 7, the neighborhood of metrics around metric 3, as specified by an example metric graph, are depicted. The metrics are shown as circles with an identification number for each metric enclosed in the circle. Neighbor metrics that are experiencing an anomaly are shown with no shading while neighbor metrics that are not experiencing an anomaly are shown with hatching. Although shown as an undirected graph, the graph may include edges with directions, which may be used to indicate causality between metrics. The graph may be cyclic, although this is not a requirement.

Each anomalous metric is labeled with a corresponding anomaly score as determined by the anomaly scoring module 224. In addition, edge weights between the anomalous metrics are depicted. These edge weights are predefined in the metric graph relationship data store 252 and represent how closely connected any two metrics are to each other.

Intuitively, more metrics in a combined anomaly mean that the combined anomaly is more likely to be insignificant.

However, there may be many sets of metrics so closely related to each other that a simultaneous anomaly for the set of metrics should be expected. For example, multiple metrics of CPU utilization may be gathered, including idle time, system processing time, user processing time, and total processor utilization. These four metrics are additively related and in some scenarios may have a correlation of nearly 1.0. Therefore, looking at two of these metrics being in an anomalous state may essentially double count the same information.

Other metrics may have the characteristic that they are associated with many different other metrics. For example, CPU utilization for a database used by a wide variety of other different servers may be related to metrics on those servers. Therefore, there is a significant possibility that an anomaly in the database CPU utilization would be anomalous at the same time as quite a few other metrics without there actually being a causal link.

One way of accounting for these various metric relationship characteristics is to use the following process to determine an effective number of metrics ($N_{eff}$). The effective number of metrics is calculated in the following example by dividing a first quantity $N_1$ by a second quantity $N_2$. For the first quantity, one is added to the product of a sum and a weighted average. The sum is all of the scores in the neighborhood of the first metric. The weighted average is based on an inverse of the weight for edges connecting anomalous metrics (that is, metrics currently determined to be experiencing an anomaly).

When the weights are expressed from 0 to 1, an inverse may be determined by subtracting the weight from 1. The sum of 1 minus the weight for each edge connecting between the anomalous metrics is then divided by the number of these edges to arrive at the weighted average. This is expressed in Equation 1 as follows:

$$N_1 = \left[\left(\sum_{i=1}^{NumNode} score_i\right) * \frac{\sum_{edges}(1 - W_{ij})}{NumAnomalousEdges}\right] +$$

$$1 = \left[(0.9 + 0.2 + 0.7 + 0.9 + 0.8 + 0.4 + 0.5) * \right.$$

$$\left.\frac{(0.01 + 0.01 + 0.2 + 0.5 + 0.6 + 0.3)}{6}\right] + 1 = \left[4.4 * \frac{1.62}{6}\right] + 1 = 2.08$$

As shown above, substituting the example values from FIG. 7 into Equation 1 leads to a value for the quantity $N_1$ of 2.08.

The quantity $N_2$ is determined by the average total number of edges across the anomalous metrics. This includes the edges connecting anomalous nodes to non-anomalous nodes (non-anomalous nodes meaning metrics that are presently within the expected baseline). The sum of the number of edges emanating from each metric is divided by the number of anomalous as notes as shown in Equation 2:

$$N_2 = AverageNodeDegree =$$

$$\frac{\sum_{nodes} NumTotalEdges_i}{NumNodes} = \frac{(3 + 1 + 3 + 6 + 1 + 1 + 1)}{7} = 2.2857$$

Substituting the example values from FIG. 7 into Equation 2 results in a value for $N_2$ of 2.2857. Taking the ratio of $N_1$ and $N_2$ as described above is shown as Equation 3:

$$N_{eff} = \frac{N_1}{N_2} = \frac{2.08}{2.2857} = 0.91$$

The effective number of metrics is used as described in more detail below to adjust the combined score for the anomalous metrics. First, a single score may be determined which may simply be a maximum of the scores of the anomalous metrics. In FIG. 7 the maximum score is 0.9, which is present at both metrics 2 and 4. Therefore, the combined anomaly score may initially be set as 0.9. The initial score of 0.9 may then be raised to the quantity $1/N_{eff}$, which when substituting the calculated value of $N_{eff}$ from above, results in 0.89:

$$0.9^{1/0.91} = 0.89$$

Because this value is less than the maximum score of 0.9, the maximum score of 0.9 may instead be used. The maximum score will be greater any time the effective number of metrics is less than one. This is true when scores are represented between 0 and 1 because a first value less than 1 raised to a power that is less than 1 results in a value larger than the first value.

In FIG. 8, a screenshot of an example user interface depicts a set of detected anomalies. Each of the six anomalies includes a score in the upper-left-hand corner, which are shown as being 91, 84, 84, 83, 83, and 82. In addition, the start time of the anomaly and the duration of the anomaly are shown. For example, the upper-left anomaly began at 7:21 p.m. and lasted for ten minutes.

Each of the anomalies is shown with a plot of a selected one of the metrics associated with that anomaly. In the upper-left-hand left anomaly, there are twenty-one associated metrics and one of the twenty-one metrics is shown as a graphical plot. The remaining anomalies in FIG. 8 each correspond to a single metric.

As seen in the screenshot, the user interface allows for a variety of filters to be set such as a lower bound on the score, which is set at 70, meaning that only anomalies having a score over 70 are shown. In addition, a date range is available for filtering and a sort type can be chosen. The display may be refreshed periodically or by manual instruction of the user.

Different views can be selected, which may allow for fewer or more anomalies to be shown corresponding to more or less information shown on the screen for each anomaly. The upper-left anomaly has twenty-one metrics with only one being graphically depicted. Ghosted arrows on either edge of the plot of the selected metric allow for other metrics associated with this anomaly to be shown on the present screen. By selecting the anomaly, additional data can be shown for the anomaly, such as in the screenshot of FIG. 9.

Among the user interface options available in FIG. 8 are thumbs-up and thumbs-down icons below each anomaly. These icons allow a user to identify an anomaly as being a true positive (thumbs-up) or a false positive (thumbs-down). As described above, a false positive should be included in the anomaly model as an expected anomaly while true positives should remain as stand-outs from the standard less significant anomalies.

In FIG. 9, plots of three of the metrics associated with the twenty-one metric anomaly of FIG. 8 are shown. A baseline is shown in light gray surrounding the top metric. Note that the second and third metrics have a baseline that is so narrow as to be indistinguishable from the values of the metrics. At the right-hand side of FIG. 9, the values of the second and third metrics begin to increase rapidly. It is seen that the shaded baseline increases as well, but at not such a rapid rate. Therefore, the anomaly may begin when the metric readings of the second and third metrics rise faster than the baselines one the right-hand side of FIG. 9.

The x-axis of FIG. 9 is time and the y-axis is intensity. Each of the metrics has an associated intensity number displayed that, in this example, is relative to the baseline. The top metric has a deviation of ten times from the baseline. Although this deviation is not shown within the time span of FIG. 9, this deviation occurs either to the left or to the right of the time span actually shown in FIG. 9. The deviation of the second metric is 2.65 times the baseline. Meanwhile, the deviation of the third metric is 0.83 times as large as the baseline. The portion of the metric that exceeds the baseline may be visually accented, such as by being drawn with a different color.

In various implementations, names of metrics may be broken apart into tokens. The breaks may be made at predetermined punctuation marks, such as periods, commas, or underscores. The tokens for metrics associated with an anomaly may be displayed in, for example, a histogram, a pie chart, a topic cloud, etc. The graphical representation visually emphasizes, such as with a larger font, a different color, or a more central location in a web, tokens that appear to be more significant to the anomaly, such as by appearing more frequently.

As one example, this may lead to SQL-DB and CPU tokens being presented prominently when metrics with SQL-DB and CPU in their names contribute to a detected anomaly. In various implementations, the anomaly detection system may display tokens without attempting to extract any meaning from the text, instead continuing to rely on the received values of the metrics to correctly assess the metrics.

Figure 10:
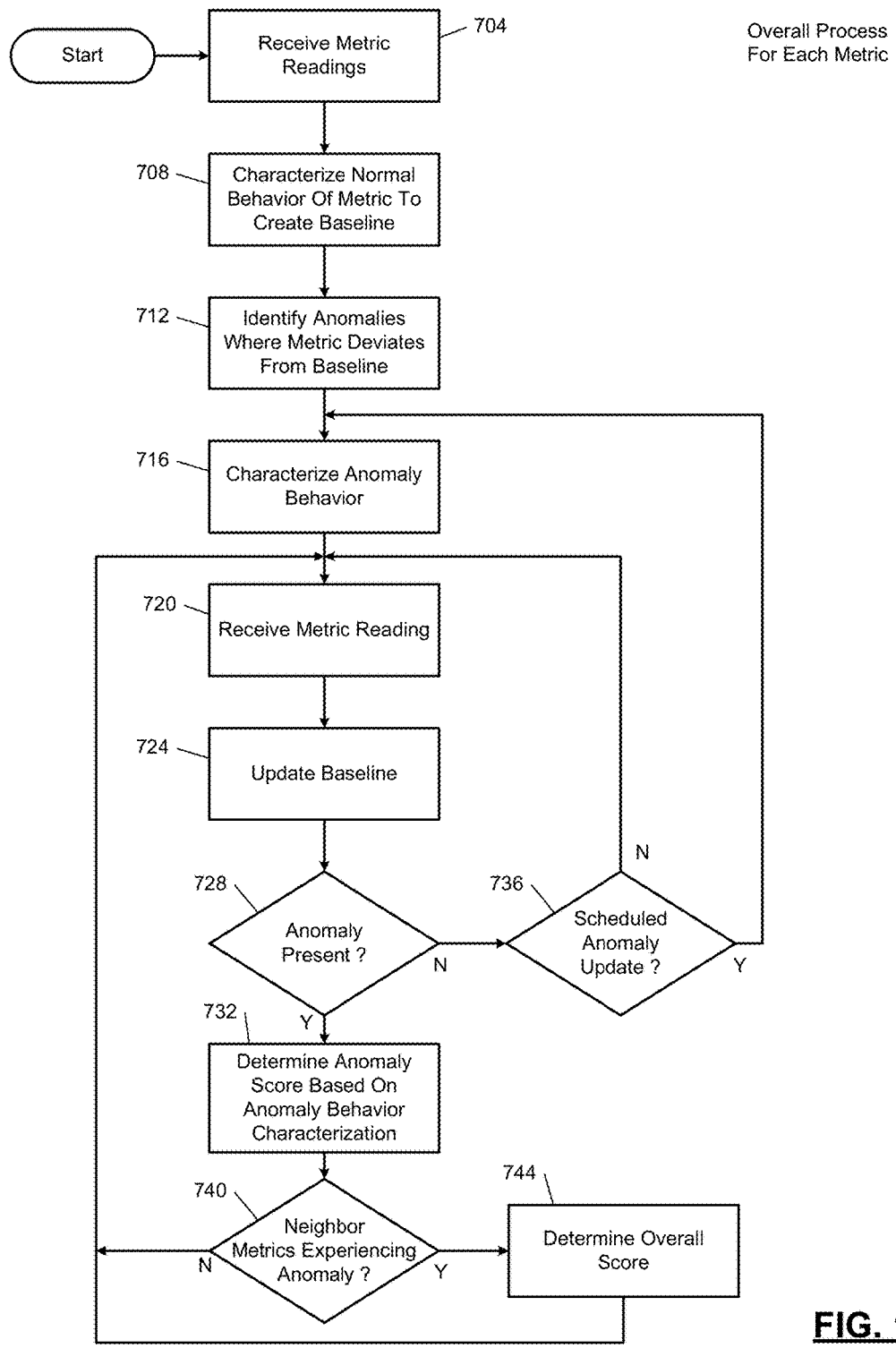
FIG. 10 is a flowchart of an overall process performed for each metric.

In FIG. 10, an overall process formed for each metric is shown. This process may be performed in parallel for each metric or may be interleaved across all of the metrics. In other implementations, the process may be performed in full for each metric before moving on to the next metric. When a large number of metrics is present, the processing may be distributed, with each portion of the distributed system operating on different metrics.

Control starts at 704 where metric readings for a first metric are received. The 'first' metric is simply used to refer to the specific metric under consideration and there is no significance (such as intensity, importance, etc.) associated with the term 'first'. Control continues at 708 where normal behavior of the first metric is characterized to create a baseline.

At 712 control identifies an anomaly when the first metric's readings deviate outside of the established baseline for the first metric. At 716 the metric's anomalies are characterized. At 720 control receives additional metric readings and at 724 control selectively updates the baseline according to the received metric readings. As described above, the rate at which the baseline is updated may be reduced when an anomaly is present, as determined at 728.

At 728, if an anomaly is present, control transfers to 732; otherwise, control transfers to 736. At 732 an anomaly is present and, therefore, control determines an anomaly score based on the characterized anomaly behavior. Control then continues at 740 where control determines whether neighbor metrics of the first metric are experiencing an anomaly. If so, control transfers to 744; otherwise, control returns to 720.

At 744 control determines an overall score based on the first metric and the neighbor metrics also experiencing anomalies. Control then returns to 720. Referring now to 736, control determines whether an anomaly update is scheduled. If so, control returns to 716; otherwise, control returns to 720. The anomaly update may be scheduled periodically such as once per day and may correspond to a time when the anomaly detection system generally has a lower processing load.

Figure 11:
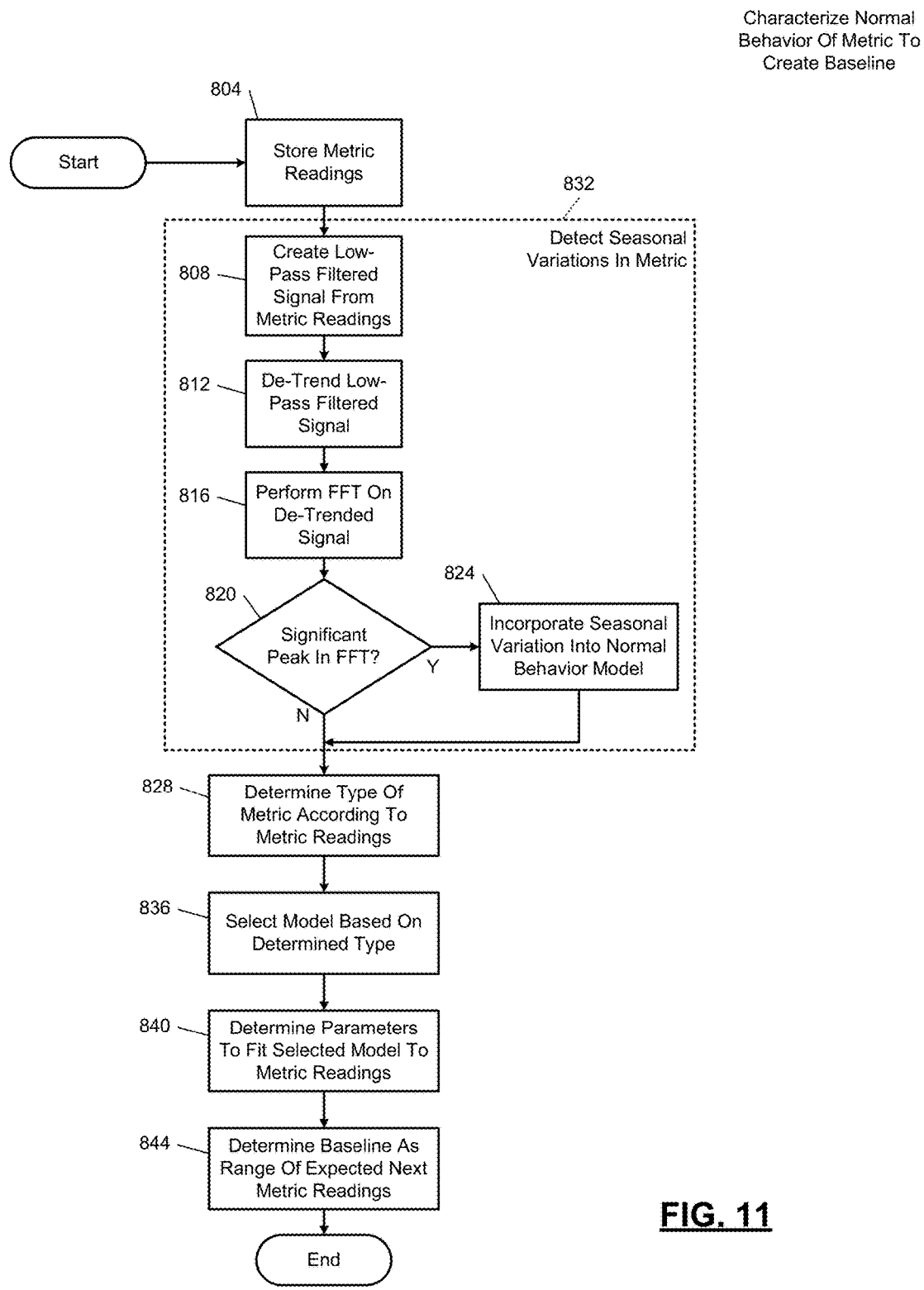
FIG. 11 is a flowchart of example normal behavior characterization for a metric.

FIG. 11 depicts how normal behavior is characterized, which may be an implementation of 708 of FIG. 10. Control starts at 804 where metric readings are stored. Control then continues at 808 where a low-pass-filtered signal is determined from the metric readings. At 812 control de-trends the low-pass filtered signal. For example, de-trending may determine a best fit line for the low-pass filtered signal and then adjust the low-pass filtered signal so that the line is parallel to the x-axis.

At 816 control performs a fast Fourier transform (FFT) on the de-trended signal. The FFT may be limited to avoid aliasing and in some implementations may be limited to periods of 168 hours or less. This corresponds to a week, meaning that only seasonal patterns of up to a week will be detected.

Control determines whether there is a significant peak in the FFT. If so, control transfers to 824. Otherwise, control continues at 828. At 824 the significant peak is presumed to correspond to seasonal behavior and control incorporates the seasonal variation into the normal behavior model. For example, the seasonal variation may be removed when determining the type of metric at 828 and then re-added to the final, normal behavior model. Control then continues at 828. The seasonal variation of 808, 812, 816, 820, and 824 is shown together with reference numeral 832 and is optional, meaning that it can be removed in some implementations.

At 828 control determines the type of metric according to the stored metric readings. At 836 control selects a model based on the determined type of the metric. At 840 parameters are determined to fit the selected model to the metric readings. At 844 control determines a baseline for the metric when the metric defines the range of expected readings as a function of time for the metric. Control then ends.

Figure 12:
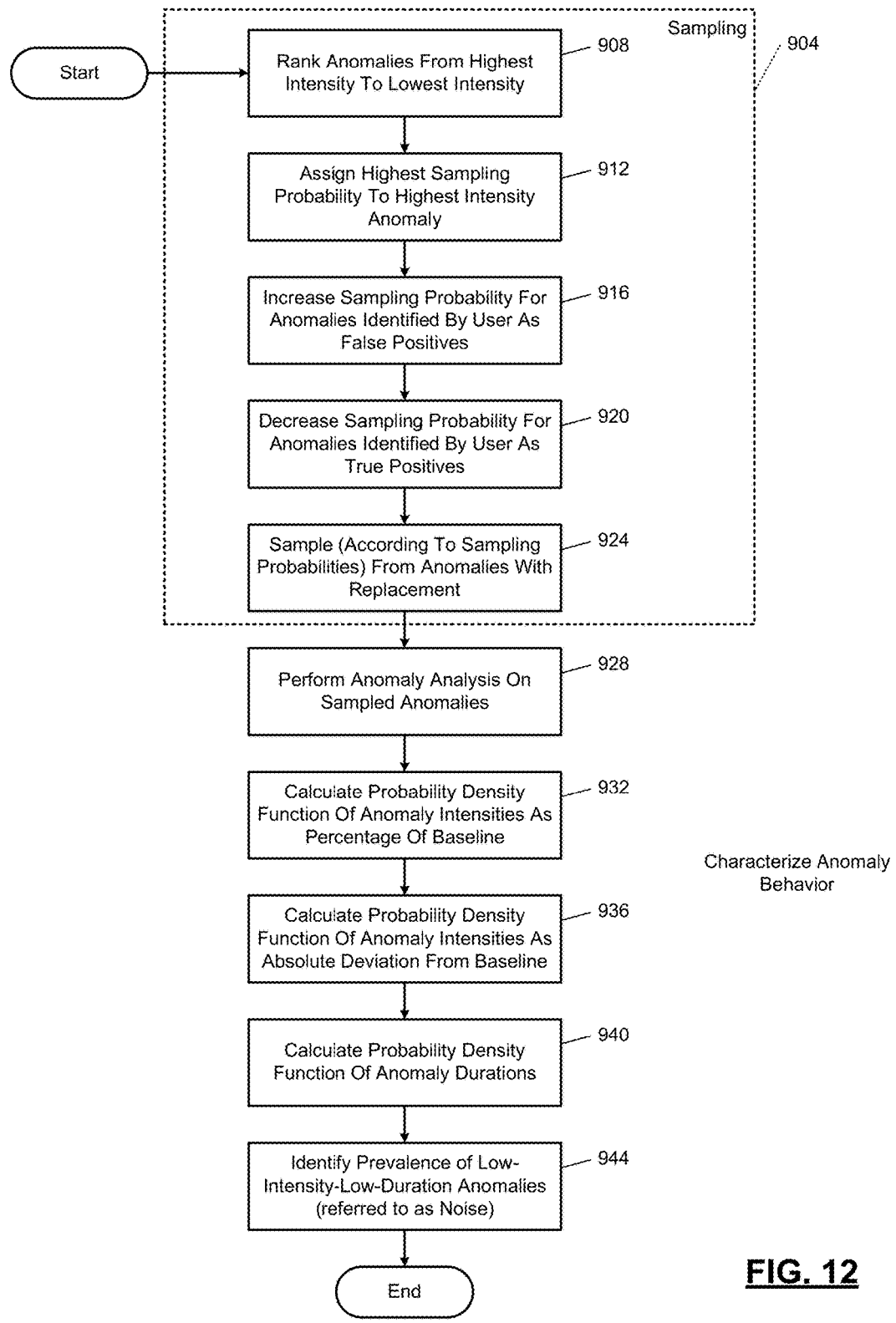
FIG. 12 is a flowchart of example anomaly behavior characterization for a metric.

In FIG. 12, anomaly behavior characterization is performed, which may be an implementation of 716 of FIG. 10. Control begins sampling operation 904 at 908 where anomalies are ranked from the highest intensity to the lowest intensity (using either relative or absolute intensities). Control continues at 912 where the highest sampling probability is assigned to the highest intensity anomaly.

At 916 control increases the sampling probability for anomalies identified by the user as false positives. At 920 control decreases the sampling probability for anomalies identified by the user as true positives. This causes true positives to have less impact on the anomaly characterization and therefore results in true positives standing out more from regular, insignificant anomalies.

At 924 control samples from the historical anomalies according to the established sampling probabilities. In this example, the sampling is performed with replacement, meaning that the same anomalies may be sampled more than once. Control continues at 928 where anomaly analysis is performed on the sampled anomalies. At 932 control calculates a probability density function of anomaly intensities as a percentage of the baseline. This represents relative intensity of the anomalies.

At 936 control calculates a probability density function of anomaly intensities as an absolute deviation from the baseline where the absolute deviation is normalized to a full range of the metric. At 940 control calculates a probability density function of durations of anomalies. At 944 control identifies the prevalence of low-intensity and low-duration anomalies, which is referred to as noise. Control then ends.

Figure 13:
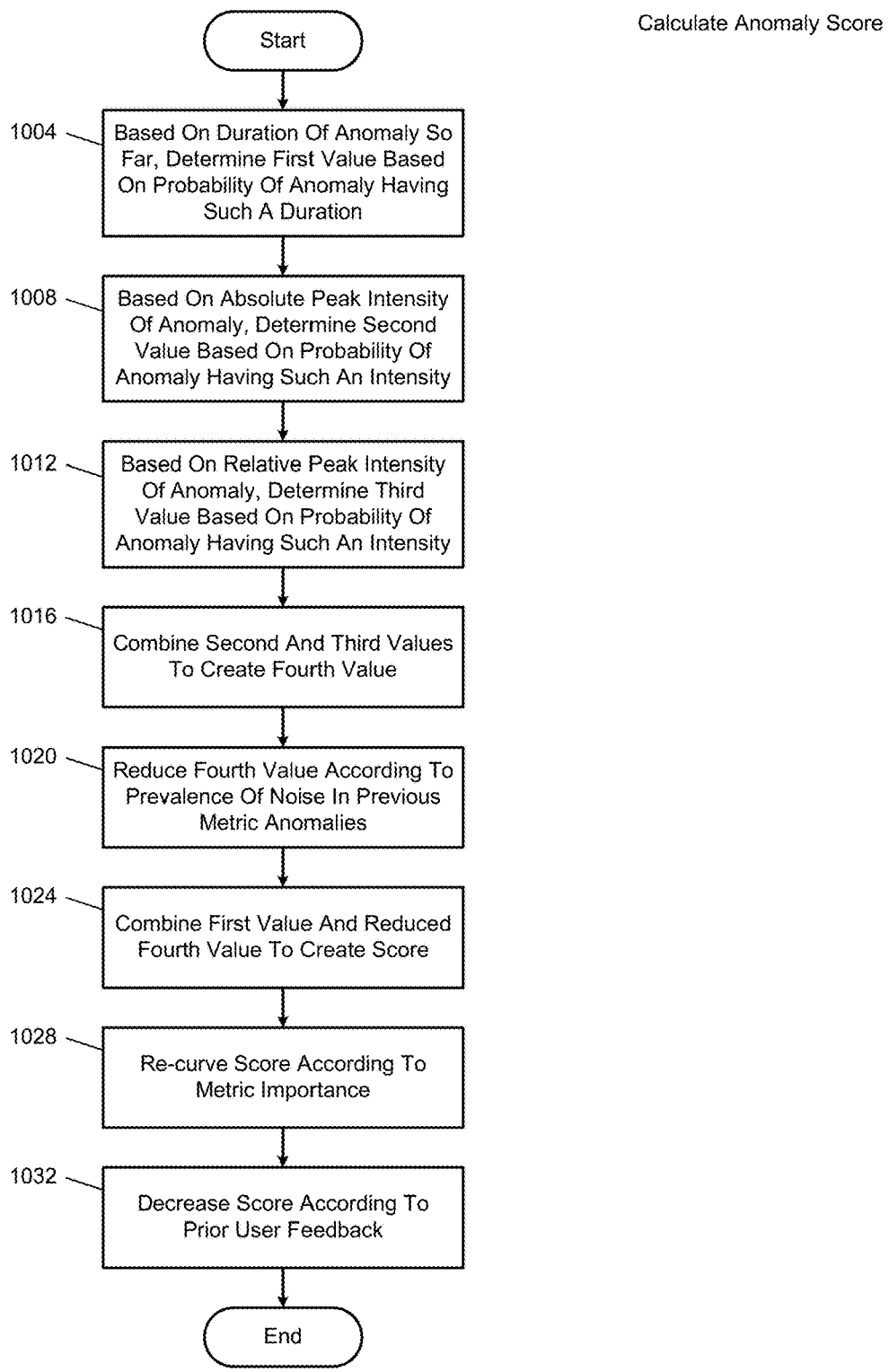
FIG. 13 is a flowchart of anomaly score calculation for a single metric.

In FIG. 13, an anomaly score for a single metric is calculated. Control starts at 1004 where based on the duration of the anomaly so far, a first value is determined based on the probability of an anomaly having a duration of at least that length. At 1008 control determines a second value based on the probability of an anomaly having an absolute peak intensity associated with the present anomaly. At 1012 control determines a third value based on the probability that an anomaly would have an intensity corresponding to the present relative peak intensity of an anomaly.

At 1016 control combines the second and third values to create a fourth value such as by using a harmonic average. At 1020 control reduces the fourth value according to the prevalence of noise in previous metric anomalies. Control continues at 1024 where the first value and the reduced fourth value are combined to create an anomaly score. Note that the noise reduction in some implementations may instead be performed after 1024 to reduce the combined first and fourth value. At 1028 control re-curves the score according to the importance of the metric. At 1032 control decreases (or increases) the score according to prior user feedback.

Figure 14:
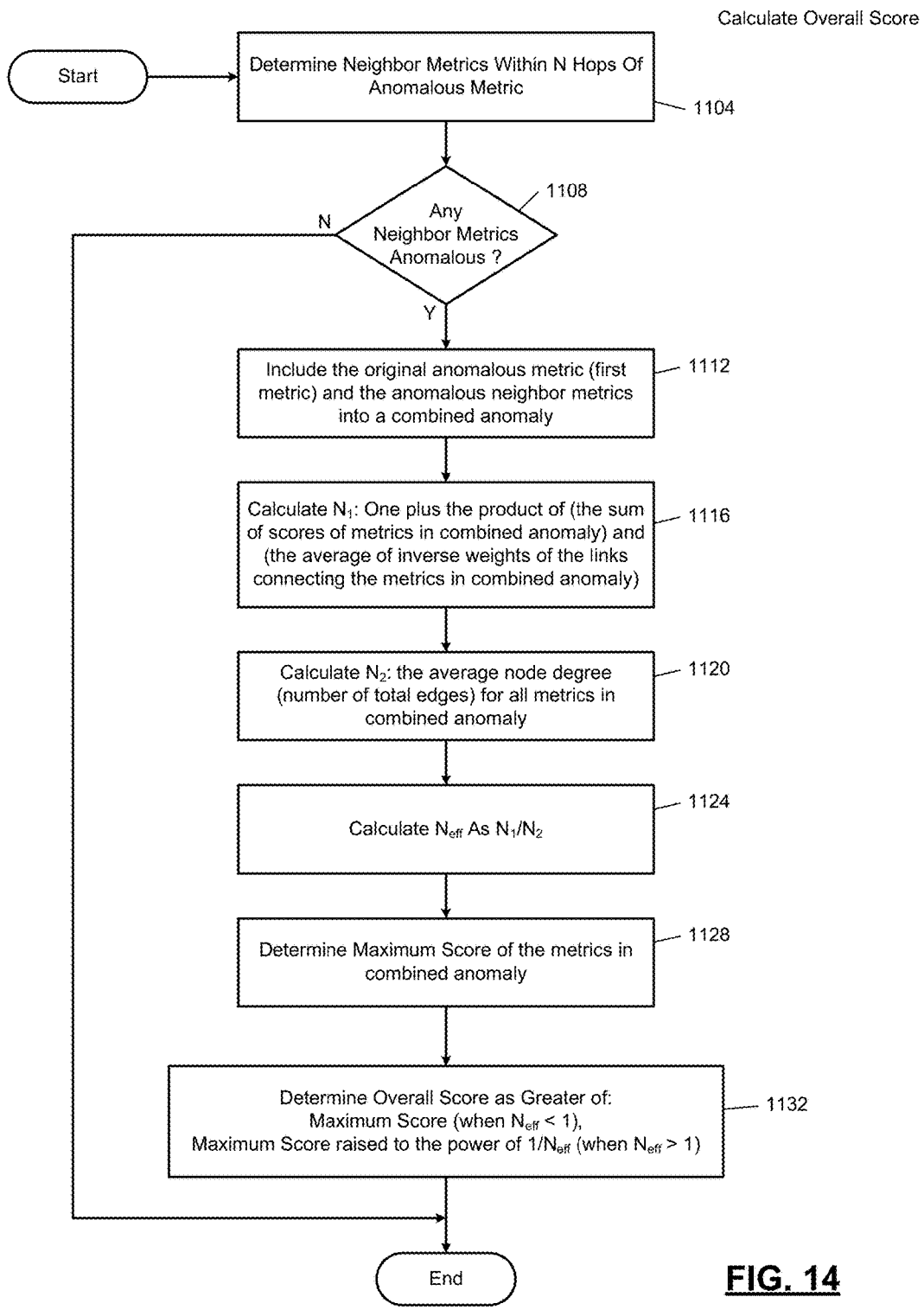
FIG. 14 is a flowchart of example overall score calculation for a multiple metric anomaly.

FIG. 14 shows how an overall score for a combined anomaly is created. Control begins at 1104 where control determines neighbor metrics within N hops of the first metric. At 1108 control determines whether any of these neighbor metrics are also experiencing an anomaly. If so, control transfers to 1112; otherwise control ends.

At 1112 control includes the original anomalous metric (first metric) and the anomalous neighbor metrics into a combined anomaly. At 1116 control calculates $N_1$ as 1 plus the product of (i) the sum of scores of metrics in the combined anomaly and (ii) the average of inverse weights of the links connecting the metrics in the combined anomaly. At 1120 control calculates $N_2$ as the average node degree (number of total edges) for all metrics in the combined anomaly. At 1124 control calculates the number of effective metrics as the ratio of $N_1$ to $N_2$.

At 1128 control determines a maximum score of all of the metrics in the combined anomaly. For example, this may simply be a maximum function that chooses the largest score from among the metrics. At 1132 control determines the overall score for the combined metric as the greater of the maximum score (which is the case when $N_{eff}$ is less than 1) and the maximum score raised to the power of 1 divided by $N_{eff}$ (which is the case when $N_{eff}$ is greater than 1). Control then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Swift, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a normal behavior characterization circuit configured to (i) receive values for a first metric of a plurality of metrics, and (ii) generate a baseline profile indicating normal behavior of the first metric based on the received values;
   an anomaly identification circuit configured to identify an anomaly in present values of the first metric in response to the present values deviating outside the baseline profile;
   an anomaly behavior characterization circuit configured to (i) analyze a plurality of prior anomalies identified by the anomaly identification circuit and (ii) based on the plurality of prior anomalies, develop a model of anomalies of the first metric;
   an anomaly scoring circuit configured to determine a first score for a present anomaly identified by the anomaly identification circuit for the first metric, wherein the first score is based on characteristics of the present anomaly and the model of the anomalies of the first metric; and
   a reporting circuit configured to send an alert to a designated user in response to the first score exceeding a threshold,
   wherein the normal behavior characterization circuit is configured to update the baseline profile in real-time as the values for the first metric are received, and
   wherein the anomaly behavior characterization circuit is configured to update the model of the anomalies of the first metric on a periodic schedule.

2. The system of claim 1 further comprising an anomaly combination circuit configured to selectively:
   combine the present anomaly detected for the first metric with anomalies presently experienced by other ones of the plurality of metrics to create a combined anomaly; and
   determine an overall score for the combined anomaly based on scores for the metrics in the combined anomaly.

3. The system of claim 2 wherein the anomaly combination circuit is configured to determine the overall score based on a maximum value of the scores of the metrics in the combined anomaly.

4. The system of claim 2 wherein the reporting circuit is configured to graphically present the overall score and selectively indicate the other ones of the plurality of metrics in the combined anomaly.

5. The system of claim 2 further comprising a relationship data store configured to store information representing a graph in which the plurality of metrics are nodes in the graph and direct relationships between each pair of the plurality of metrics are edges in the graph.

6. The system of claim 5 wherein the other ones of the plurality of metrics used for the combined anomaly are limited to within at most N hops from the first metric in the graph, wherein each hop corresponds to one of the edges in the graph, and wherein N is a predetermined integer greater than zero.

7. The system of claim 5 wherein the relationship data store is configured to store edge information indicating strengths of the direct relationships in the graph, wherein the strength of a direct relationship between two nodes indicates how closely correlated the two nodes are to each other.

8. The system of claim 7 wherein the anomaly combination circuit is configured to determine the overall score such that:
   an increase in the scores for the metrics in the combined anomaly corresponds to an increase in the overall score; and
   an increase in a total number of edges connected to the metrics in the combined anomaly corresponds to a decrease in the overall score.

9. The system of claim 7 wherein the anomaly combination circuit is configured to determine the overall score such that:
   the overall score is based on a maximum value of the scores of the metrics in the combined anomaly raised to an exponent;
   the exponent is proportional to a ratio of a first quantity and a second quantity;
   the first quantity is proportional to a sum of the scores for the metrics in the combined anomaly; and
   the second quantity is proportional to a sum, for each of the metrics associated with the overall score, of how many edges are connected to the metric.

10. The system of claim 7 wherein the anomaly combination circuit is configured to determine the overall score such that:
   the overall score is based on a maximum value of the scores of the metrics in the combined anomaly raised to an exponent;
   the exponent is inversely proportional to a ratio of a first quantity and a second quantity;
   the first quantity is directly proportional to a sum of the scores for the metrics in the combined anomaly;
   the first quantity is directly proportional to a sum of inverses of the edge information for edges connecting the metrics associated with the overall score with each other;
   the first quantity is inversely proportional to a count of the edges connecting the metrics associated with the overall score with each other; and
   the second quantity is directly proportional to an average number of edges connected to the metrics associated with the overall score.

11. The system of claim 1 wherein the model of the anomalies of the first metric includes (i) a statistical distribution of intensities of the anomalies with respect to the baseline profile and (ii) a statistical distribution of durations of the anomalies.

12. The system of claim 1 wherein the model of the anomalies of the first metric includes (i) a statistical distribution of relative intensities of the anomalies normalized to the baseline profile, (ii) a statistical distribution of absolute intensities of the anomalies relative to the baseline profile but normalized to a full range of the first metric, and (iii) a statistical distribution of durations of the anomalies.

13. The system of claim 1 wherein the anomaly behavior characterization circuit is configured to:
    distinguish, based on user feedback, at least one of (i) anomalies representing false positives and (ii) anomalies representing true positives; and
    at least one of (i) decrease contributions to the model from anomalies representing true positives compared to other anomalies and (ii) increase contributions to the model from anomalies representing false positives compared to other anomalies.

14. A method of monitoring a system that generates a plurality of metrics, the method comprising:
    receiving values for a first metric of the plurality of metrics;
    generating a baseline profile indicating normal behavior of the first metric based on the received values;
    identifying an anomaly in present values of the first metric in response to the present values deviating outside the baseline profile;
    analyzing a plurality of prior identified anomalies;
    developing, based on the plurality of prior identified anomalies, a model of anomalies of the first metric;
    determining a first score for a present anomaly identified for the first metric, wherein the first score is based on characteristics of the present anomaly and the model of the anomalies of the first metric;
    sending an alert to a designated user in response to the first score exceeding a threshold;
    updating the baseline profile in real-time as the values for the first metric are received; and
    updating the model of the anomalies of the first metric on a periodic schedule.

15. The method of claim 14 wherein the model of the anomalies of the first metric includes (i) a statistical distribution of intensities of the anomalies with respect to the baseline profile and (ii) a statistical distribution of durations of the anomalies.

16. The method of claim 14 wherein the model of the anomalies of the first metric includes (i) a statistical distribution of relative intensities of the anomalies normalized to the baseline profile, (ii) a statistical distribution of absolute intensities of the anomalies relative to the baseline profile but normalized to a full range of the first metric, and (iii) a statistical distribution of durations of the anomalies.

17. The method of claim 14 further comprising:
    distinguishing, based on user feedback, at least one of (i) anomalies representing false positives and (ii) anomalies representing true positives; and
    at least one of (i) decreasing contributions to the model from anomalies representing true positives compared to other anomalies and (ii) increasing contributions to the model from anomalies representing false positives compared to other anomalies.

18. The method of claim 14 further comprising selectively:
    combining the present anomaly detected for the first metric with anomalies presently experienced by other ones of the plurality of metrics to create a combined anomaly; and
    determining an overall score for the combined anomaly based on scores for the metrics in the combined anomaly.

19. The method of claim 18 wherein the overall score is determined based on a maximum value of the scores of the metrics in the combined anomaly.

20. The method of claim 18 further comprising graphically presenting the overall score and selectively indicating the other ones of the plurality of metrics in the combined anomaly.

21. The method of claim 18 further comprising storing information representing a graph in which the plurality of metrics are nodes in the graph and direct relationships between each pair of the plurality of metrics are edges in the graph.

22. The method of claim 21 wherein the other ones of the plurality of metrics used for the combined anomaly are limited to within at most N hops from the first metric in the graph, wherein each hop corresponds to one of the edges in the graph, and wherein N is a predetermined integer greater than zero.

23. The method of claim 21 wherein the graph includes edge information indicating strengths of the direct relationships in the graph, wherein the strength of a direct relationship between two nodes indicates how closely correlated the two nodes are to each other.

24. The method of claim 23 wherein the overall score is determined such that:
    an increase in the scores for the metrics in the combined anomaly corresponds to an increase in the overall score; and
    an increase in a total number of edges connected to the metrics in the combined anomaly corresponds to a decrease in the overall score.

25. The method of claim 23 wherein the overall score is determined such that:
    the overall score is based on a maximum value of the scores of the metrics in the combined anomaly raised to an exponent;
    the exponent is proportional to a ratio of a first quantity and a second quantity;
    the first quantity is proportional to a sum of the scores for the metrics in the combined anomaly; and
    the second quantity is proportional to a sum, for each of the metrics associated with the overall score, of how many edges are connected to the metric.

26. The method of claim 23 wherein the overall score is determined such that:
    the overall score is based on a maximum value of the scores of the metrics in the combined anomaly raised to an exponent;
    the exponent is inversely proportional to a ratio of a first quantity and a second quantity;
    the first quantity is directly proportional to a sum of the scores for the metrics in the combined anomaly;
    the first quantity is directly proportional to a sum of inverses of the edge information for edges connecting the metrics associated with the overall score with each other;
    the first quantity is inversely proportional to a count of the edges connecting the metrics associated with the overall score with each other; and the second quantity is directly proportional to an average number of edges connected to the metrics associated with the overall score.

\* \* \* \* \*